United States Patent [19]
Sasaki

[11] Patent Number: 5,691,646
[45] Date of Patent: Nov. 25, 1997

[54] CAPACITANCE-TYPE DISPLACEMENT MEASURING DEVICE WITH ELECTRODES HAVING SPIRAL PATTERNS

[75] Inventor: Kouji Sasaki, Kanagawa, Japan

[73] Assignee: Mitutoya Corporation, Tokyo, Japan

[21] Appl. No.: 559,559

[22] Filed: Nov. 16, 1995

[30] Foreign Application Priority Data

Dec. 7, 1994 [JP] Japan .................. 6-330689
Dec. 12, 1994 [JP] Japan .................. 6-332084

[51] Int. Cl.⁶ .................. G01R 27/26; G01B 3/18
[52] U.S. Cl. .................. 324/662; 324/686; 324/690; 340/870.37; 341/15; 33/784
[58] Field of Search .................. 324/660, 661, 324/662, 671, 683, 686, 690; 340/870.37; 341/15; 318/653, 661; 33/783, 784, 813, 825, 830

[56] References Cited

U.S. PATENT DOCUMENTS

| | | | |
|---|---|---|---|
| 4,864,300 | 9/1989 | Zaremba | 341/15 X |
| 4,882,536 | 11/1989 | Meyer | 324/671 |
| 4,951,048 | 8/1990 | Ichikawa et al. | 341/15 |
| 5,239,307 | 8/1993 | Andermo | 340/870.37 |
| 5,461,320 | 10/1995 | Strack et al. | 324/662 |
| 5,495,677 | 3/1996 | Tachikake et al. | 33/784 |
| 5,534,859 | 7/1996 | Meyer | 340/870.37 |

FOREIGN PATENT DOCUMENTS

| | | |
|---|---|---|
| 047 463 | 3/1982 | European Pat. Off. |
| 0-246-592 | 11/1987 | European Pat. Off. |
| 0-579-586-A | 1/1994 | European Pat. Off. |
| 1-226-147 | 7/1960 | France. |
| 34 26 750 | 1/1986 | Germany. |

*Primary Examiner*—Ernest F. Karlsen
*Assistant Examiner*—Diep Do
*Attorney, Agent, or Firm*—Oliff & Berridge

[57] ABSTRACT

A rotary encoder 10 is composed of a halfway cylindrical stator 11 and a cylindrical rotor 12. The rotor 12 is disposed coaxial with the stator 11 with a predetermined gap. Plural transmitting electrodes 13 with spiral patterns and receiving electrode 14 with a rectangular pattern are formed on the inner surface of the stator 12. The transmitting electrodes 13 and receiving electrode 14 are formed of a FPC substrate 17 with lead lines 15, 16. On the outer surface of the rotor 12, coupling electrode 18 are formed with a spiral pattern so as to be capacitively coupled to the transmitting electrodes 13 and receiving electrode 14. FIG. 4C

11 Claims, 26 Drawing Sheets

CAPACITANCE-TYPE DISPLACEMENT MEASURING DEVICE WITH ELECTRODES HAVING SPIRAL PATTERNS

BACKGROUND OF THE INVENTION

1. Field of the Invention

The present invention relates to a capacitance-type displacement measuring device used for a small measuring device such as an electric micrometer, hole test, dial gauge, angle-measuring equipment and the like.

2. Description of the Prior Art

Numerous capacitance-type measuring device for making linear or angular measurements have been developed wherein two scales, on which are respectively arranged, capacitively coupled electrodes, are displaced relative to each other, and the relative positions of the two scales are determined by sensing capacitance change between the electrodes. The precision of these capacitance-type measuring sensors is determined by the divisional number of the electrodes on the scales. Therefore, for obtaining a high resolution, it is necessary to fine at least one of transmitting electrodes and receiving electrodes.

FIG. 29 shows a scheme of a prior capacitance-type displacement measuring device. The device comprises a first and second scales displaced to relatively movable. On the first scale, a plurality of first transmitting electrodes 1 are arranged with a constant space, and receiving electrode 4 is disposed along the longitudinal direction of the scale. In this case, each unit of the first transmitting electrodes 1 consists of 8 electrodes. 8-phases sine wave signals, which are pulsed based on the clock pulse from an oscillator 5, and whose phases are mutually shifted by 45°, are generated from a pulse modulating circuit 6 to be supplied to the first transmitting electrodes 1. Therefore, the width of each unit of the transmitting electrodes 1 is equal to a transmitting wavelength pitch Wt1.

As disposed on the second scale are arranged second receiving electrodes 2 with a pitch Pr2 equal to the transmitting wavelength pitch Wt1, which are capacitively coupled to 4 transmitting electrodes 1 on the first scale. Also disposed on the second scale are second transmitting electrodes 3 which are electrically connected with the second receiving electrodes 2 and capacitively coupled to the first receiving electrode 4 on the first scale. The first receiving electrode 4 is connected to a measuring circuit 7.

In the device as described above, when the first and second scales are relatively moved, phase of received signal vary based on the capacitive coupling between the first transmitting electrodes 1 and the second receiving electrodes 2. It is able to measure displacement by sensing the phase variation of the received signal. In this case, since the device has 8 transmitting electrodes, and these electrodes are driven by multi-phase signals, as phase shifted with respect to each other by 45°, it is able to determine a measurement position within a precision of Pr2/8.

If the first and second scales in the above-described capacitance-type measuring device are formed of coaxial cylindrical members, it is able to obtain a small cylindrical displacement sensor.

FIG. 30A and FIG. 30B show an example of expanded electrode patterns of outer cylindrical member (i.e., stator) and inner cylindrical member (i.e., rotor) in such a cylindrical displacement sensor. As shown in these figures, two units A, B of first transmitting electrodes 1, each of the units having 8 electrodes, and a first receiving electrode 4 are formed on the inner surface of the stator. Two units of second receiving electrodes 2 opposed to first transmitting electrodes 1 and second transmitting electrodes 3 opposed to the first receiving electrode 4 are formed on the outer surface of the rotor.

For manufacturing such a cylindrical displacement sensor, it is necessary to form electrode patterns on a cylindrical surface. Several methods for forming such electrode patterns, especially electrode patterns on the stator, for example, have been provided as follows: (1) electrode patterns are formed on a flexible print circuit (FPC) substrate, then the FPC is affixed to the inner surface of a cylindrical member (refer to U.S. Pat. No. 5,239,307); (2) electrode patterns are formed on the surface of a cylindrical member by laser beam machining (refer to German Patent No. 3,426,750).

Further, for making a highly precise measurement, it is necessary to dispose the stator and the rotor with a high concentricity. However, it is difficult to obtain a high concentricity in a small cylindrical sensor. For realizing highly precise measurement in spite of that the concentricity is bad, it is necessary to arrange at least two units of electrodes, as shown in FIG. 30A and 30B. When two units of electrodes are arranged in angular direction, the influence of misalignment between the stator and the rotor can be canceled by averaging the two outputs of the electrode units.

However, several problems are remained in such a cylindrical displacement sensor in the conventional arts. First, it is difficult to form electrode patterns on a cylindrical member by use the above-mentioned methods. Especially, smaller the cylindrical member is, more difficult the process for forming the precise patterns becomes. Second, It is difficult to connect the electrode patterns on the inner surface of the cylindrical member to an external measuring circuit, and to assemble a stator and a rotor. If it is necessary to form 2 units of electrodes for solving the problem of concentricity, the wirings between the sensor and the external measuring circuit become more complicated, and operation process becomes more complicated, too. Since there are problems to be solved as above described, the cylindrical displacement sensor is not yet practically used.

SUMMARY OF THE INVENTION

An object of the present invention is to provide a capacitance-type measuring device which can be readily wired and constructed, and whose electrode patterns can be easily formed.

Another object of the present invention is to provide a capacitance-type measuring device which is not necessary for highly concentricity, thereby electrode patterns can be simplified.

A first aspect of the present invention is a capacitance-type measuring device for measuring relative position between first and second elements which are arranged to be relatively movable with a predetermined gap, comprising: an array of transmitting electrodes disposed on the first element, alternating signals having different phases from each other being supplied to each transmitting electrode; a receiving electrode disposed on the first element such as to be isolated from the array of transmitting electrodes; and a coupling electrode disposed on the second element to be capacitively coupled to plural electrodes in the array of transmitting electrodes and the receiving electrode, the receiving electrode being adapted to output an electric signal corresponding to a relative position between the first and second elements, the electric signal being supplied to a measuring circuit, wherein one of the first and second elements is an inner member having a cylindrical outer surface, the other is an outer member having an incomplete cylindrical inner surface which is opposed to the outer surface with a predetermined gap, the first and second elements being held to be relatively movable in either axial direction or angular direction, and the array of transmitting electrodes and the receiving electrode are disposed on one of the outer surface of the inner member and the inner surface of the outer member, and the coupling electrode is disposed on the other surface.

A second aspect of the present invention is a capacitance-type measuring device for measuring relative position between first and second elements which are arranged to be relatively movable with a predetermined gap, comprising: an array of transmitting electrodes disposed on the first element, alternating signals having different phases from each other being supplied to each transmitting electrode; a receiving electrode disposed on the first element such as to be isolated from the array of transmitting electrodes; and a coupling electrode disposed on the second element to be capacitively coupled to plural electrodes in the array of transmitting electrodes and the receiving electrode, the receiving electrode being adapted to output an electric signal corresponding to a relative position between the first and second elements, the electric signal being supplied to a measuring circuit, wherein one of the first and second elements is an inner member having a cylindrical outer surface, the other is an outer member having an cylindrical inner surface which is opposed to the outer surface with a predetermined gap, the first and second elements being held to be relatively movable in either axial direction or angular direction, and one of the array of transmitting electrodes and the coupling electrode is disposed on the outer surface of the inner member, the other is disposed on the inner surface of the outer member, both of the array of transmitting electrodes and the coupling electrode having spiral patterns with the same lead angle.

In the first aspect, the device comprises the inner element having the cylindrical outer surface and the outer element having the incomplete cylindrical inner surface half surrounding the inner element. Since the outer element is, for example, an incomplete cylinder whose side portion is open, it is easy to form electrode patterns in the inner surface, to lead out the wire, and to construct the elements. For example, If the electrode patterns and the lead wire thereof are formed on an FPC substrate, and then affixed to the inner surface of the outer element, the process for forming the electrode patterns including the lead wire becomes to be easy.

In the second aspect, by use of combination of a complete cylinder and an incomplete cylinder, or combination of two complete cylinders for a stator and a rotor, and by arranging the transmitting electrodes and the coupling electrodes with spiral patterns, it is able to obtain a displacement sensor for measuring angular displacement. In the displacement sensor, even if the axes are misaligned between the rotor and the stator, the gap between the transmitting electrodes and the coupling electrodes opposed each other is averaged in angular direction to be approximately constant. Therefore, even if the concentricity is not high, it is able to obtain a high measurement precise. Further, if, on each of the stator and rotor, two sets of electrode patterns having a reverse patterns each other are arranged, the influence of misalignment in axial direction between the stator and the rotor can be canceled, and it is able to measure angular displacement with high precise.

DETAILED DESCRIPTION OF THE PREFERRED EMBODIMENTS

Figure 1A:
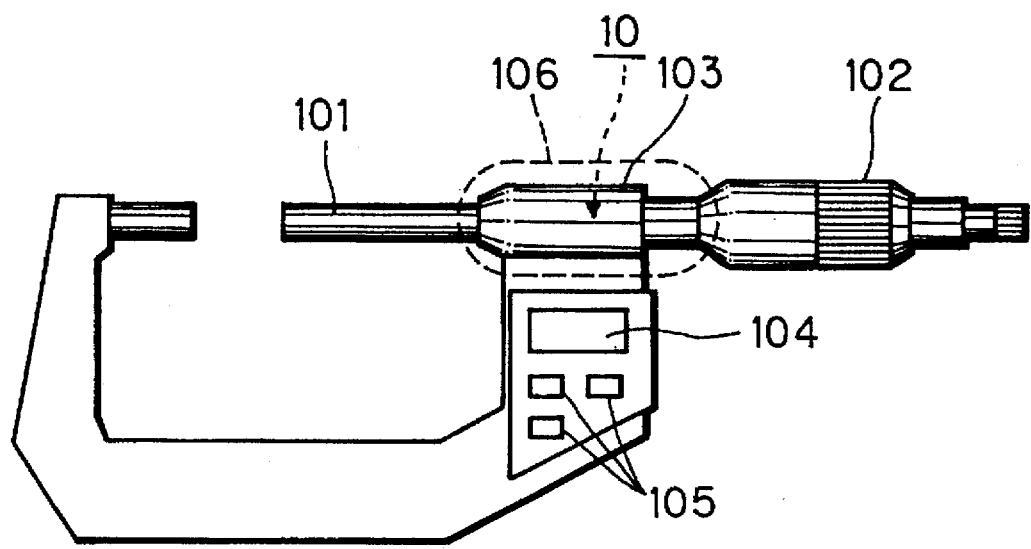
FIG. 1A and FIG. 1B show a plan view and a sectional view of the main portion of an electric micrometer including a rotary encoder according to an embodiment of the present invention.

In the bellow-described rotary encoders according to the embodiments, cylindrical inner members serve as rotors, and cylindrical or incomplete cylindrical outer members surrounding the inner members serve as stators. Electrode patterns are formed on the outer surfaces of the rotors and the inner surfaces of the stators. However, corresponding to applications, it is able to exchange the function of the inner and outer members such that the inner members serve as stators, and the outer members serve as rotors. In every modes, it is preferable that transmitting and receiving electrodes, which are connected to driving and measuring circuits, are formed on the stators.

FIG. 1 shows an electric micrometer according to a first embodiment of the present invention. In the micrometer, a spindle 101 is held in a case 103, and is able to slide by a knob 102. In the case 103, a rotary encoder 10 is installed for measuring the displacement of the spindle 101, and the measured value is displayed on a display 104. Several switches 105 are mounted near to the display 104.

Figure 1B:
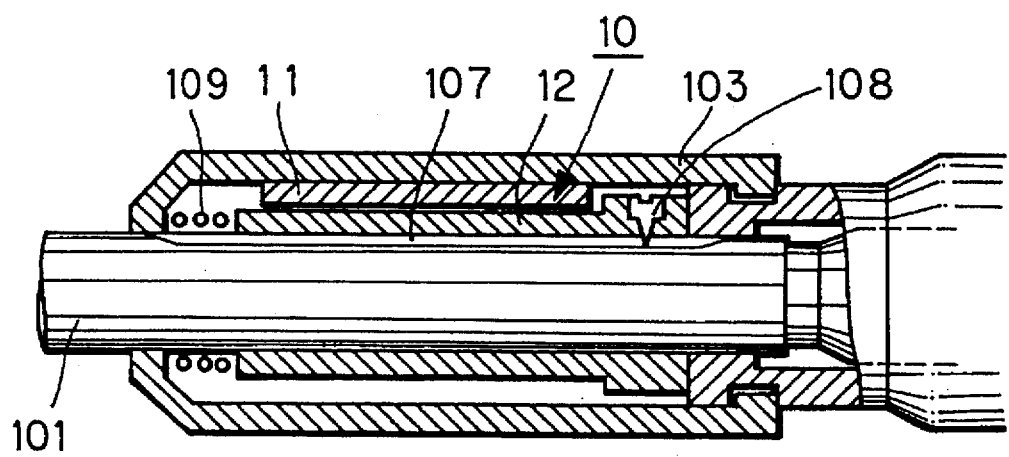

FIG. 1B is an expanded section about a region 106 in FIG. 1A for showing the installed state of the rotary encoder 10. The rotary encoder 10 comprises a rotor 12 mounted on the spindle 101 and a stator 11 installed on the inner surface of the case 103 so as to oppose the outer surface of the rotor 12. The rotor 12 consists of a cylindrical axle coaxial with the spindle 101, and the stator 11 consists of a halfway cylindrical collar which has an incomplete inner surface opposed to the outer surface of the rotor 12 with a predetermined gap. A screw 108 attached on the end portion of the rotor 12 is trapped in a longitudinal groove 107 formed on the outer surface of the rotor 12 so as to be movable along the groove 107. The rotor 12 is forced to the inner surface of the case 103 by a spring 109 to be prevented from displacement in axial direction against to the case 103. When the spindle 101 rotates and linearly displace in axial direction, the rotor 12 rotates together with the spindle 101, but does not displace in axial direction. Therefore, the rotor 12 is movable in only angular direction against to the stator 11 in accordance with the rotating and linear displacement of the spindle 101, thereby the rotated displacement can be measured.

Figure 2A:
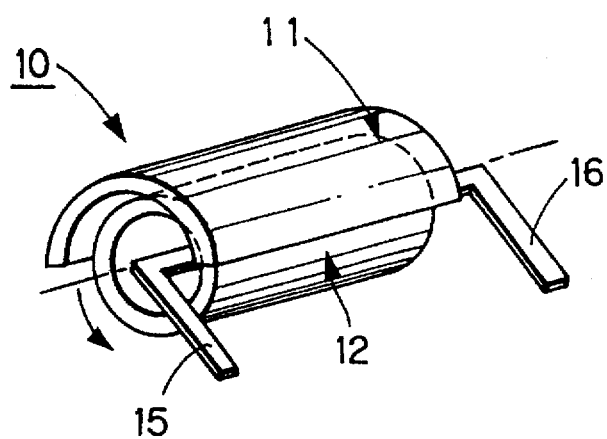
FIG. 2A to FIG. 2D show schematic examples of the rotary encoder.
Figure 2B:
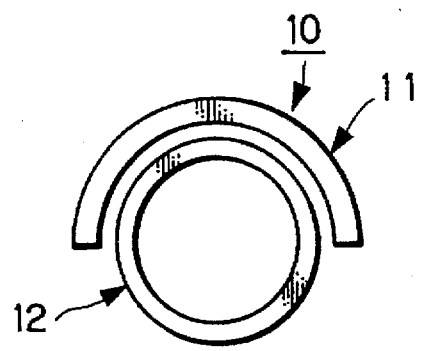
Figure 2C:
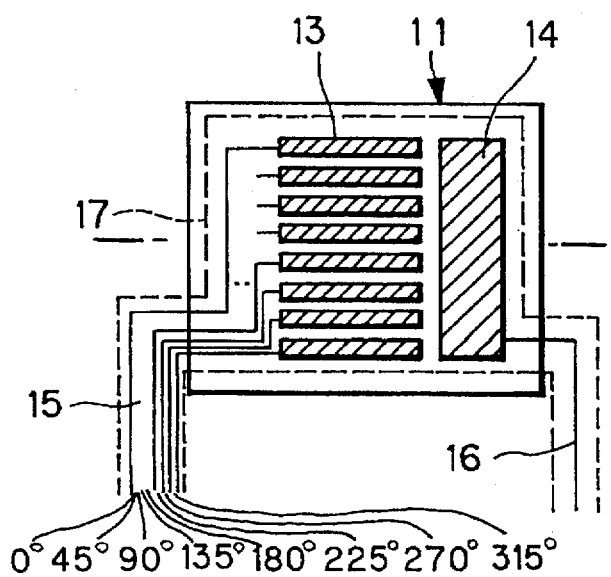
Figure 2D:
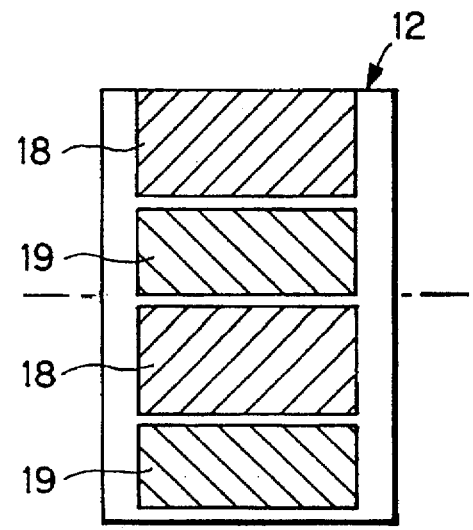

FIG. 2A and FIG. 2B show the installed state and the side view of the rotary encoder 10, respectively. FIG. 2C and FIG. 2D show the inner surface of the stator 11 and the outer surface of the rotor 12, which are rolled out, respectively. The rotor 12 is arranged to be coaxial with the stator 11 with a predetermined gap of 0.1 to 0.2 mm so as to be relatively movable.

As shown in FIG. 2C, as disposed on the inner surface of the stator 11, are an array of transmitting electrodes 13 and a receiving electrode 14, which are insulated from each other. The array of transmitting electrodes 13 is arranged with rectangular patterns longitudinal in axial direction at a predetermined pitch in angular direction. The array of transmitting electrodes 13, in this embodiment, is composed of 1 unit of N electrodes (N is an integer of 2 or more). N alternating signals which are phase shifted by 360°/N each other are supplied in numerical sequence to the N transmitting electrodes 13. In this embodiment, N=8. The receiving electrode 14 is disposed near to the transmitting electrode array 13 in axial direction on the inner surface of the stator 11 with a rectangular pattern longitudinal in angular direction.

The transmitting electrode array 13 and the receiving electrode 14 are actually formed together with lead lines 15, 16 on an FPC substrate 17, as shown by a dotted line, and the FPC substrate 17 are affixed to the inner surface of the stator 11. The lead wires 15 and 16 are drawn out from each edge of the stator 11 and connected to external driving/measuring circuit.

On the outer surface of the rotor 12, as shown in FIG. 2D, two coupling electrodes 18 and two ground electrodes 19 are disposed. The coupling electrodes 18 are formed with rectangular patterns whose length in axial direction of the patterns covers the transmitting electrode array 13 and the receiving electrode 14, and whose width in angular direction covers four transmitting electrodes 13. The coupling electrodes 18 serve to receive the transmitted signal from the transmitting electrode array 13 with capacitive coupling, and serve to transmit the received signal to the receiving electrode 14 with capacitive coupling. These electrodes 18 and 19 are actually formed on an FPC substrate, and affixed to the outer surface of the rotor 12. The grounded electrodes 19 can be omitted.

Figure 30A:
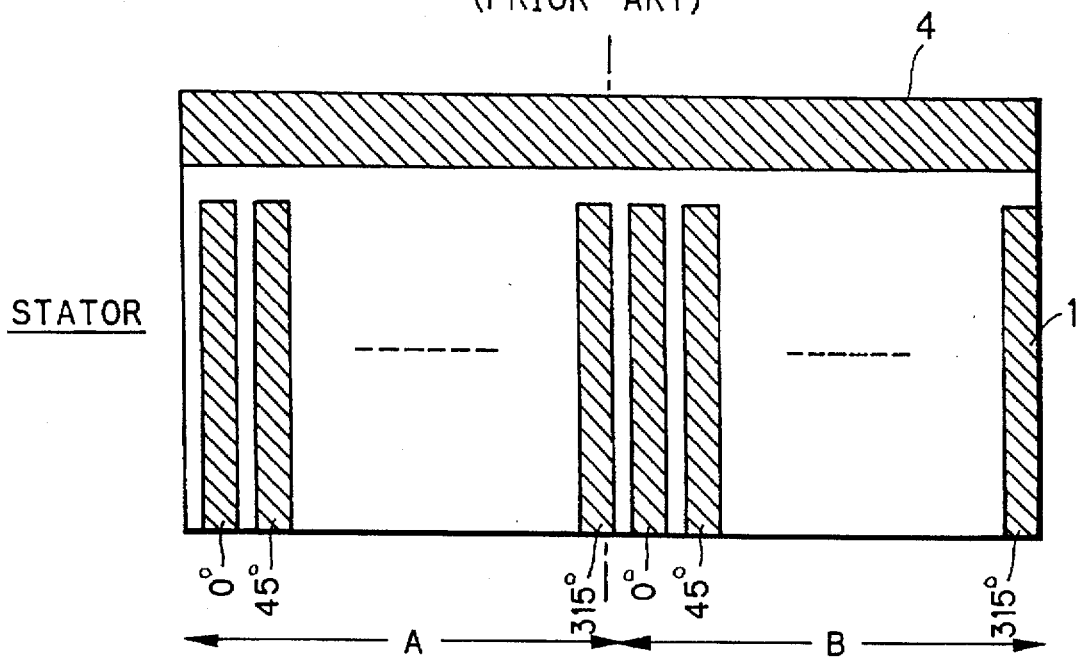
FIG. 30A and FIG. 30B show a construction of a conventional cylindrical encoder.
Figure 30B:
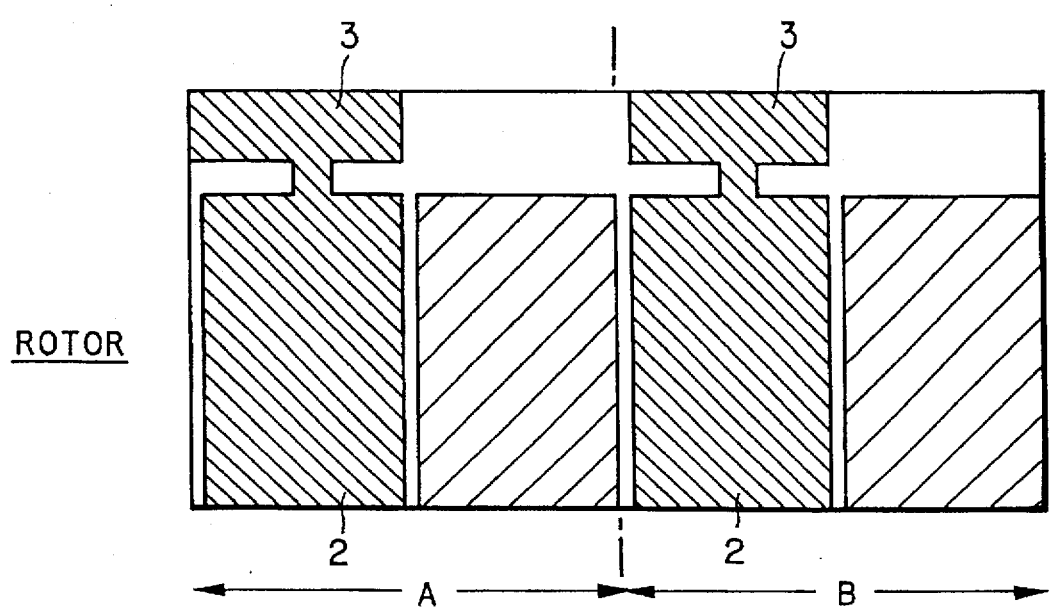

The arrangement of electrodes in the rotary encoder according to the embodiment is equivalent to that of the conventional encoder shown in FIGS. 30A, 30B. Therefore, the half-cycle πr (where r is radius of the outer surface of the rotor 12) is equal to the transmitting wavelength pitch Wt1 and the receiving electrode pitch Pr2 shown in FIGS. 30A, 30B. As a result, according to this embodiment, it is able to measure the angular displacement with a high precise of πr/8 or more.

Figure 3:
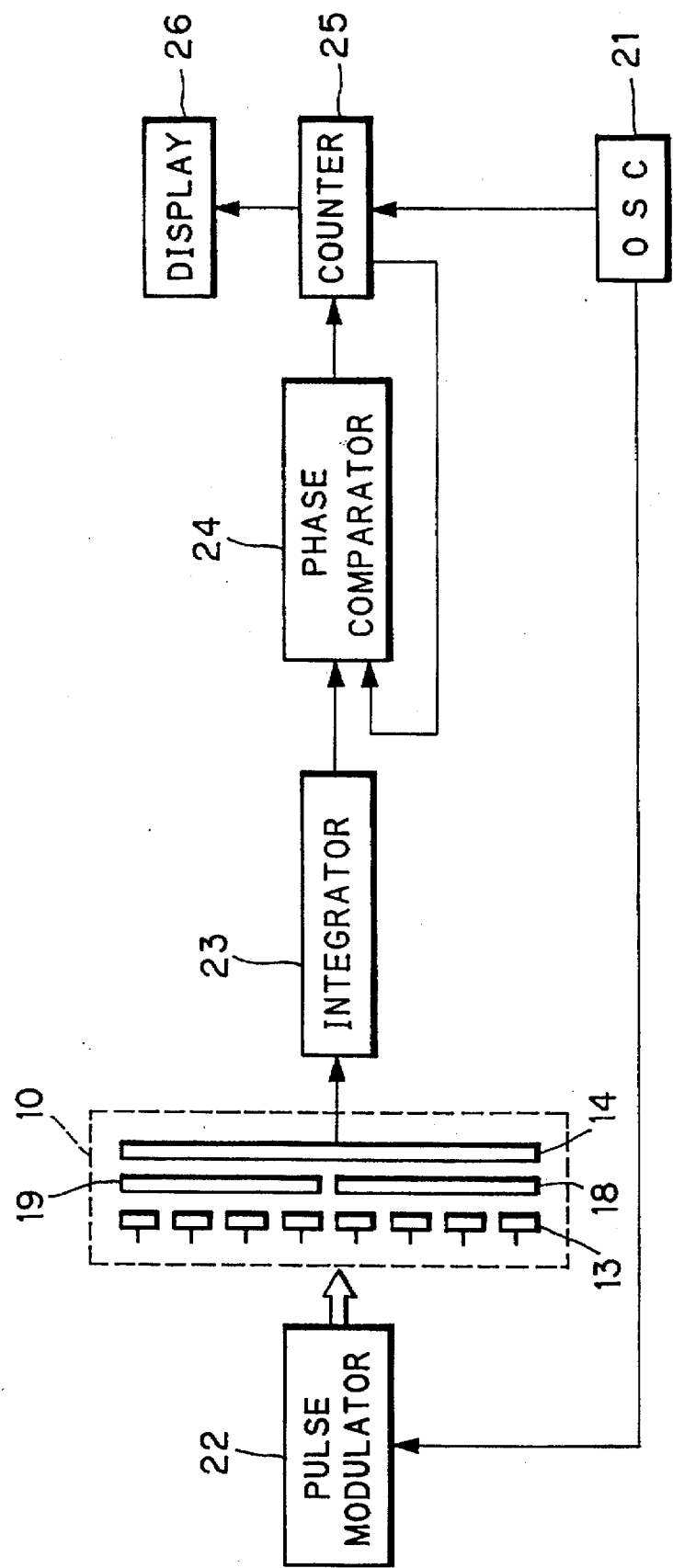
FIG. 3 shows a construction of a signal processing circuit for the rotary encoder.

FIG. 3 shows a brief construction of the driving/measuring circuit of the rotary encoder 10. This circuit includes an oscillator 21 which generates a clock signal, and a pulse modulator 22 which output eight phases alternating signals synchronized with the clock signal and phase-shifted with 45° each other to the transmitting electrode array 13.

The output of the receiving electrode 14, which changes corresponding to the relative rotation between the rotor 12 and the stator 11, is given to an integrator 23, then the output of the integrator 23 is given to a phase comparator 24. The comparator 24 compares the phase difference between the input signal and a reference signal, and detects a relative displacement between the rotor 12 and the stator 11 corresponding to an amount of the phase-shift. The output signal of the comparator 24 is input to a counter 25. The counter 25 counts the clock signals from the oscillator 21 in accordance to the detected signal of the comparator 24, and the amount of the relative displacement between the rotor 12 and the stator 11 are displayed on the display 26 with numerical values.

According to the embodiment, because of that the stator 11 is composed of a halfway cylindrical member, it is easy to form the electrode patterns and the lead wires on the inner surface of the stator 11 by use of a FPC substrate. Even if the FPC substrate is not used, the electrode patterns can be easily formed on the inner surface of the stator by use of, for example, laser beam machining technology. Alternatively, because the stator 11 has an opening longitudinal in axial direction, a laser beam can be easily irradiated to the inner surface of the stator 11 through the opening. It is also easy to connect lead wires to the electrode patterns on the inner surface of the stator 11 by soldering, thermocompression bonding, and the like.

Figure 4A:
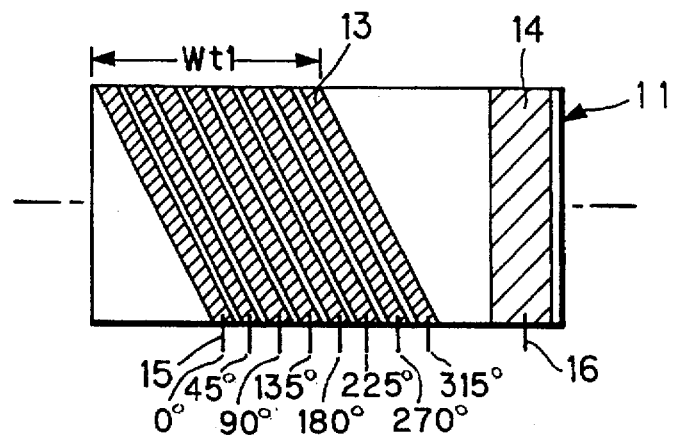
FIG. 4A to FIG. 4C show rotary encoders according to another embodiments.
Figure 4B:
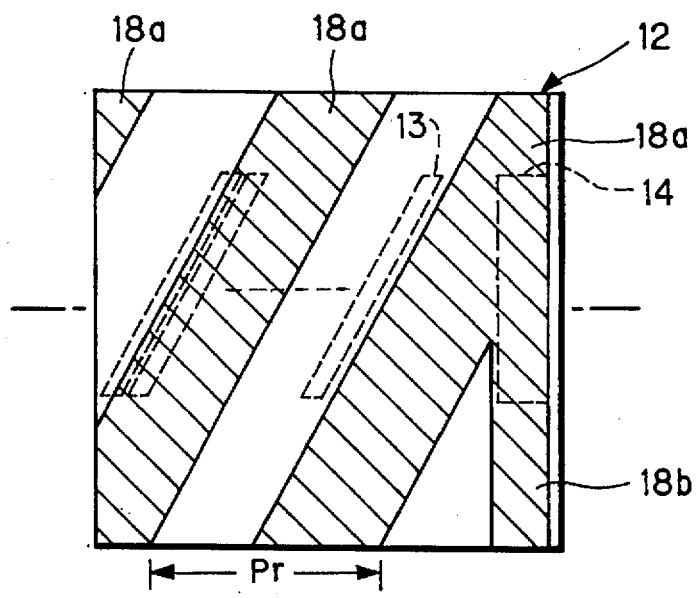

FIGS. 4A and 4B, each corresponding to FIGS. 2C and 2D, respectively, show the rolled out electrode patterns according to another example of the rotary encoder 10. As shown in FIG. 4A, the transmitting electrode array 13 on the inner surface of the stator 11 are composed of N electrodes disposed in parallel each other with spiral patterns (where N=8 in this embodiment). The receiving electrode 14 is disposed near to the transmitting electrode array 13 in axial direction with a rectangular pattern longitudinal in angular direction. The coupling electrodes 18 on the outer surface of the rotor 12, as shown in FIG. 4B, have receiving portions 18a opposed to transmitting electrode array 13 and a transmitting portion 18b opposed to the receiving electrode 14. The receiving portions 18a are formed of spiral patterns with the same lead angle as the transmitting electrode array 13, and the transmitting portion 18b is formed of a rectangular pattern similar to the receiving electrode 14, and connected to the receiving portions 18a. In FIG. 4B, the overlapping state between the transmitting electrode array 13, the receiving electrode 14 and the coupling electrodes 18 is shown by dotted lines. The coupling electrodes 18 are disposed at the same pitch Pr as the transmitting wavelength Wt1 with widths covering four transmitting electrodes 13. In the rotary encoder of FIG. 2, the phase change in one revolution of the rotor 12 is 360°×2=720°. In contrast, in the rotary encoder in FIG. 4, the phase change in one revolution of the rotor 12 is 360°.

Figure 4C:
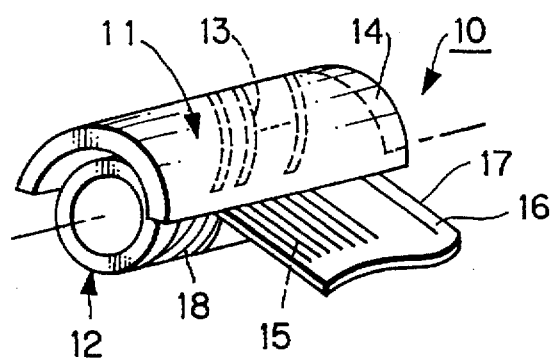

In this embodiment, the electrode patterns and the lead wires can be formed of an FPC substrate as same as the above-described embodiment. In this case, as shown in FIG. 4C, the FPC substrate 17 on which the lead linen 15, 16 are formed are dragged not from the edges, but through the side opening of the stator 11.

According to the embodiment, even if the concentricity between the stator 11 and the rotor 12 is not sufficient, the installing precision does not give a large influence for measuring precision. Because, as a result of using the spiral electrode patterns, the intensity of the output signal is equalized in angular direction. Further, since the lead lines 15, 16 are drawn out in perpendicular to the axis of the encoder, the interference between the coupling electrodes 18 on the rotor 12 and the lead lines 15, 16 is decreased.

Figure 5A:
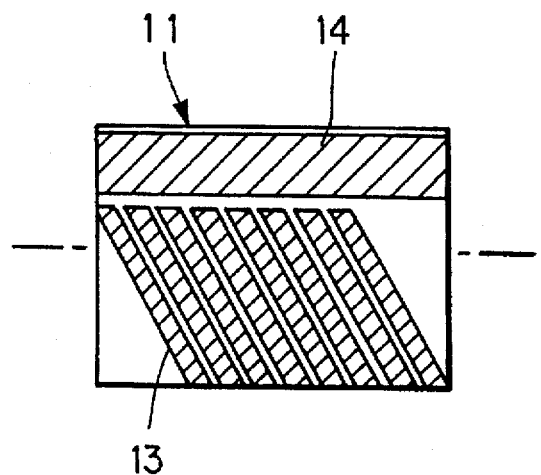
FIG. 5A and FIG. 5B show electrode patterns of a rotary encoder according to another embodiment.
Figure 5B:
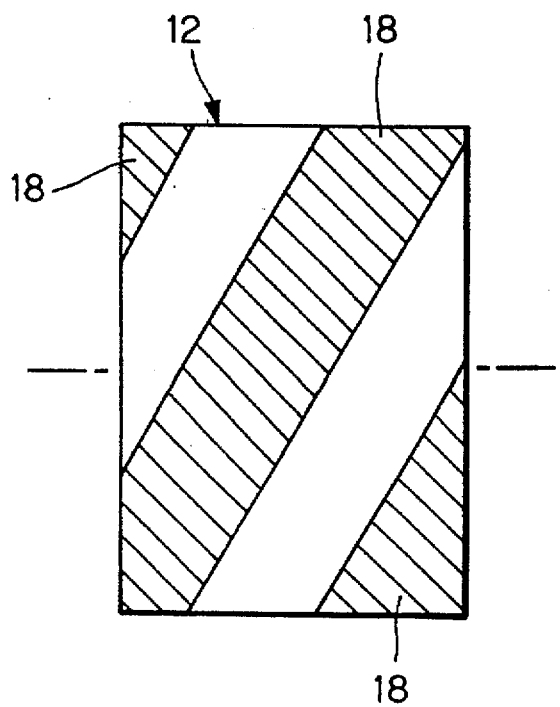

FIG. 5A and FIG. 5B show electrode patterns according to another embodiment, corresponding to FIG. 4A and FIG. 4B, respectively. In this embodiment, the receiving electrode 14 on the stator 11 is disposed near to the transmitting electrode array 13 in angular direction, and has a rectangular pattern longitudinal in axial direction. The coupling electrode 18 on the outer surface of the rotor 12 is formed of only a spiral pattern capacitively coupled to both the transmitting electrode array 13 and the receiving electrode 14, with the same lead angle as the transmitting electrode array 13. Alternatively, the receiving portion of the coupling electrode 18, which is capacitively coupled to the transmitting electrode array 13, can not be distinguished from the transmitting portion of the coupling electrode 18, which is capacitively coupled to the receiving electrode 14, and these portions are formed of a continuous spiral pattern.

According to the embodiment, the variation of the gaps between each of the transmitting electrodes 13 and the coupling electrode 18, and the variation of the gaps between the coupling electrode 18 and the receiving electrode 14 are equalized to be decreased.

Figure 6A:
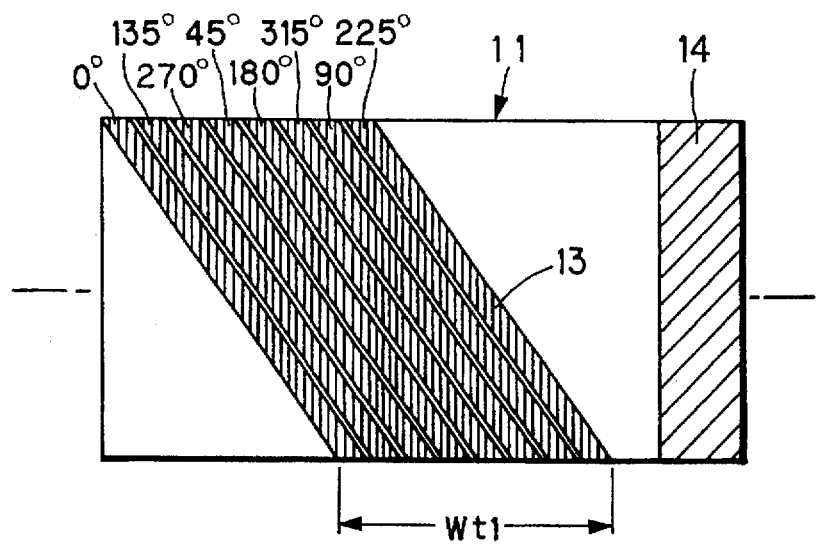
FIG. 6A and FIG. 6B show electrode patterns of a rotary encoder according to another embodiment.
Figure 6B:
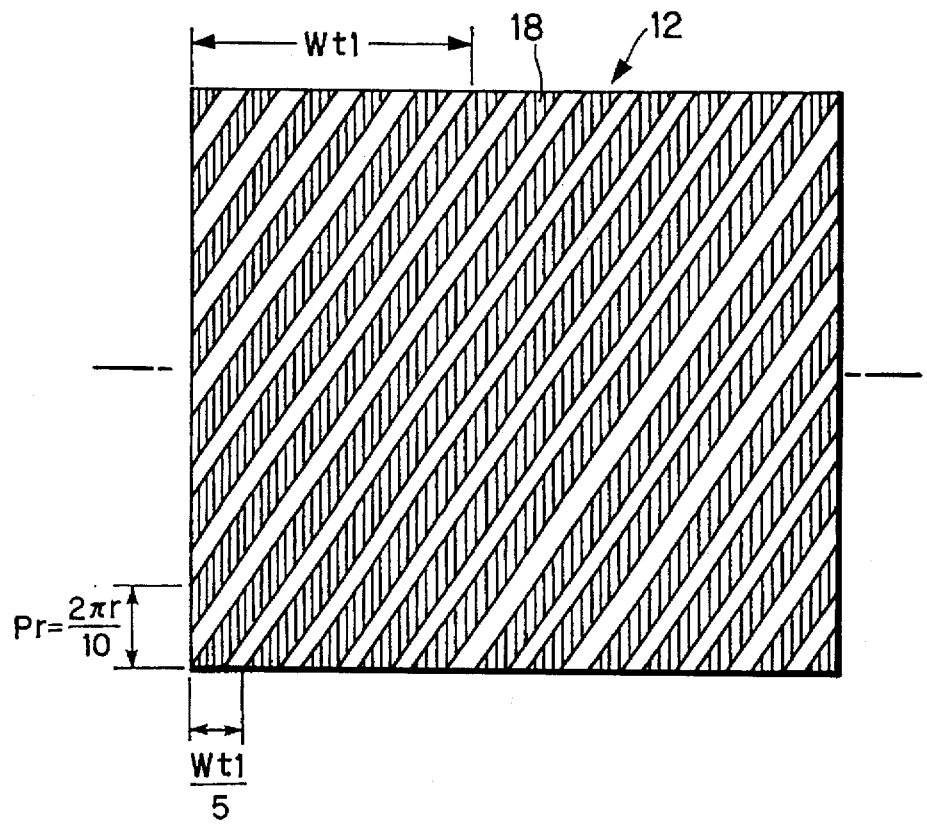

FIGS. 6A and 6B show expanded electrode patterns according to another embodiment, corresponding to FIGS. 4A and 4B, respectively. In this embodiment, the coupling electrode 18 is divided into a plurality of electrodes uniformly spaced with a pitch obtained by dividing the transmitting wavelength Wt1 by an integer n (=2 or more). In details, the coupling electrode 18 in the above-described embodiments is divided into 5 electrodes, then these electrodes are disposed at a pitch of $2\pi r/10$ with spiral patterns. Although eight transmitting electrodes array 13 have the same patterns as that in FIG. 4A, the phases of alternating signals are different from that in FIG. 4A. Alternatively, eight phases alternating signals whose phases are sequentially shifted of 135° are supplied to the transmitting electrodes 13, as shown in FIG. 6A.

According to this embodiment, when the rotor 12 rotates 1/10 revolution (i.e., 36°), the phase change of the output signal is just 360°. In other words, when the rotor 12 rotates one revolution, the output signal changes for 10 periods. The principle of the measuring method and the detailed measuring circuit in the above-mentioned embodiment has been described in details in U.S. Pat. No. 4,878,013 specification.

Figure 7:
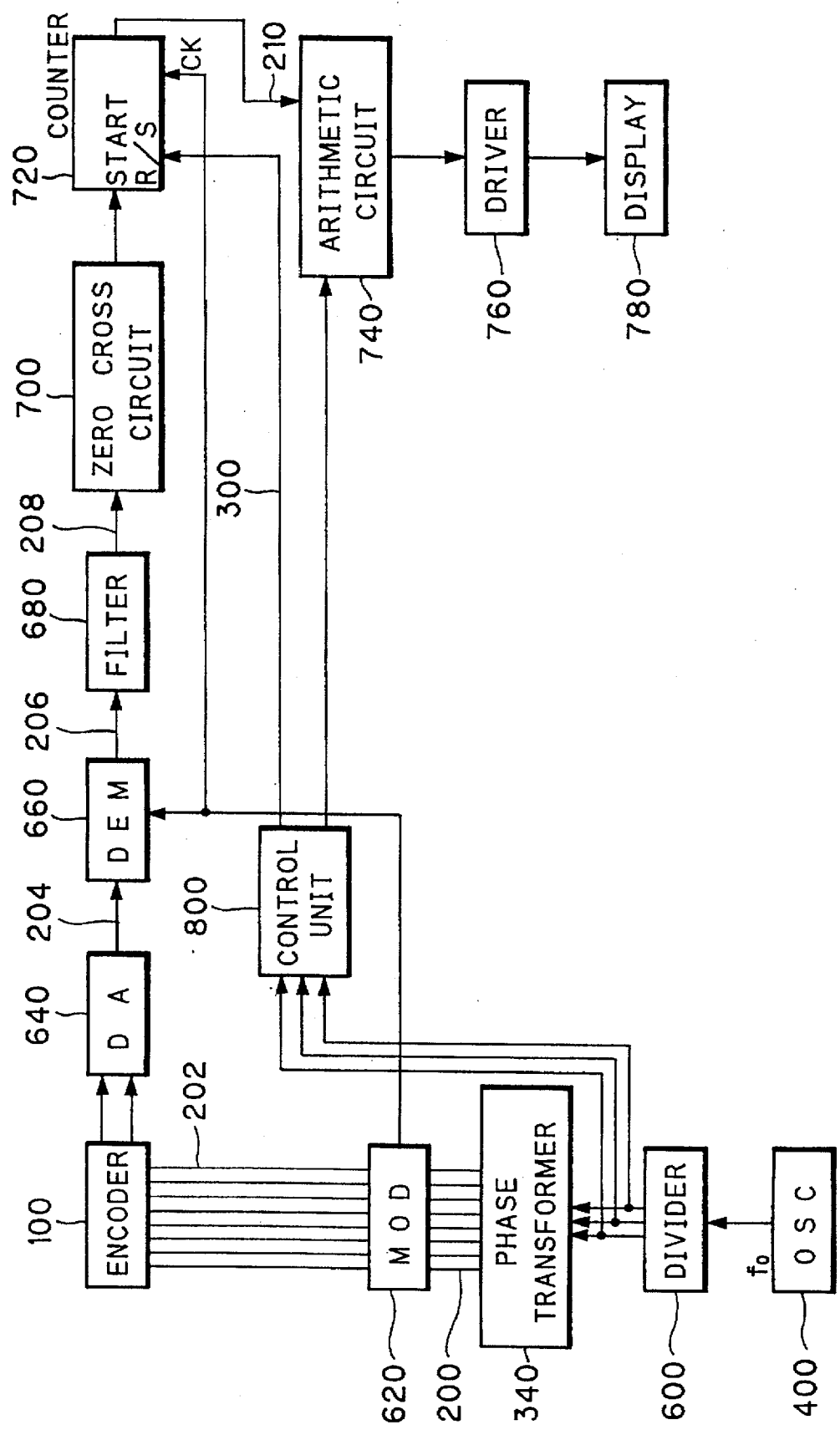
FIG. 7 shows an example of a signal processing circuit of the rotary encoder.
Figure 8:
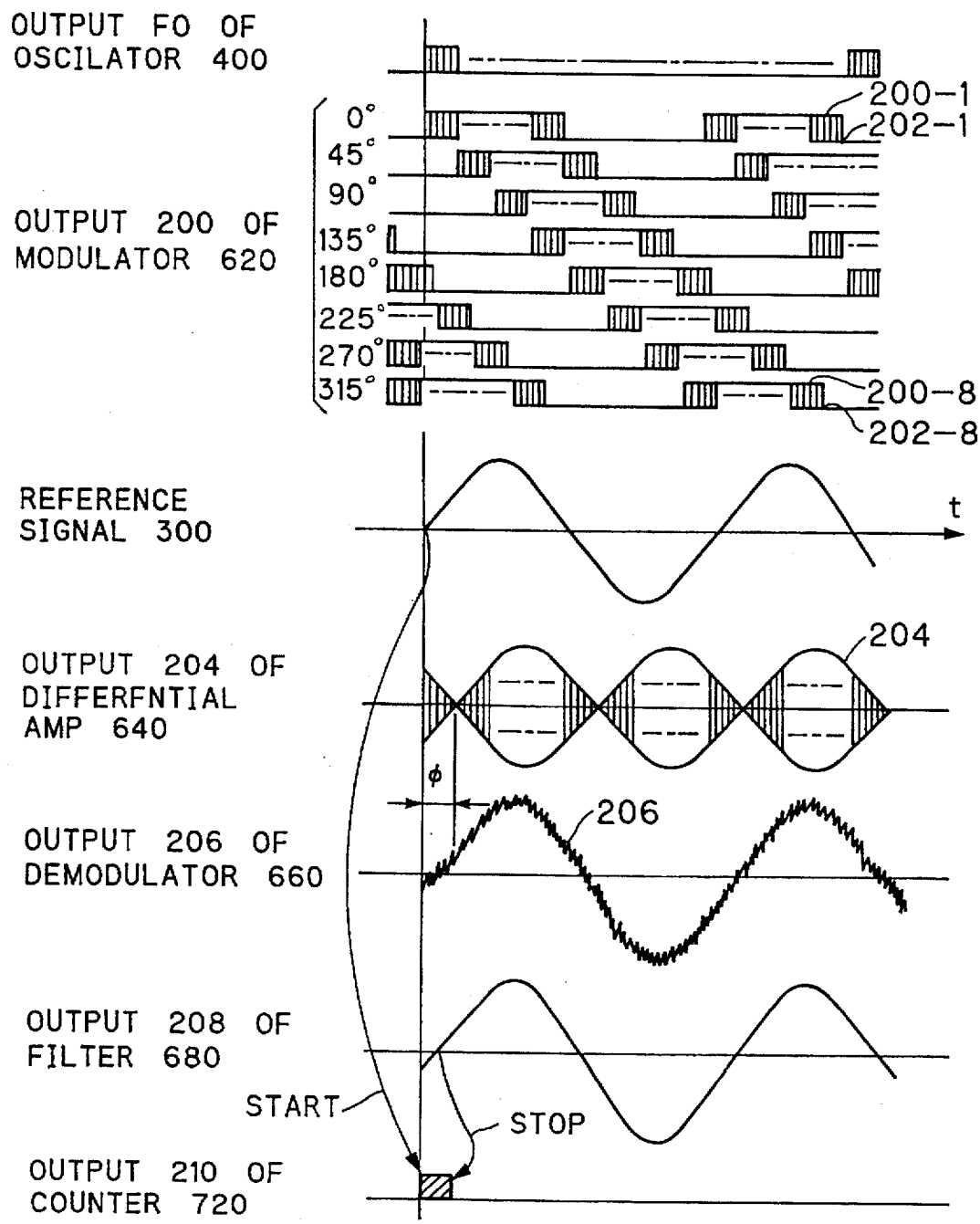
FIG. 8 shows signal waveforms of the signal processing circuit in FIG. 7.

FIG. 7 shows the measuring circuit, and FIG. 8 shows the signal waveforms and the relations between the signals as the horizontal axis serves as time. In FIG. 7, a block 100 is a rotary encoder. A plurality of alternating signals which have different phase from each other are supplied to the transmitting electrodes. An oscillator 400, which generates an alternating signal having a frequency selected in 100 to 200 kHz, is used as a signal generating source. An output f0 from the oscillator 400 is divided by a frequency divider 600, thereafter transformed into eight alternating signals, whose phases are shifted with 135° each at a phase transformer 340. Then the alternating signals are modulated by the output f0 at a modulator 620 to be eight signals 200-1, 200-2, . . . , 200-8 which are supplied to the transmitting electrodes.

The rotary encoder 100 is driven by the output signals 202 from the modulator 620, and outputs a displacement signal from the receiving electrode. The displacement signal is amplified by a differential amplifier 640 to be output as a signal 204. The envelope of the output signal 204 is, as shown in FIG. 8, a sine waveform. The output signal 204 is then demodulated in a demodulator 660 which is synchronized by the output f0 of the oscillator 400. Comparing the phase of the demodulated signal 206 and the reference signal 300 generated when the rotor is at a reference point, phase difference φ is obtained. The phase difference φ is determined by the relative position between the rotor and the stator.

The demodulated signal 206 including harmonic components is passed through a filter 680 to be less distorted signal 208. The signal 208 is input to a zero-cross circuit 700 to be detected a zero-cross position of the waveform. In this circuit, a counter 720 is used as a digital calculating means for obtaining the above-mentioned phase difference φ.

The reset/start signals for the counter 720 is synchronized with the trigger signal of the demodulator 660 and a control unit 800. The zero-cross point signal of the reference signal is used as start trigger of the counter 720. The counting timing is controlled by the output f0 of the oscillator 400. The counting operation is stopped by the output of the zero-cross circuit 700. Alternatively, the zero-cross circuit 700 generates a stop signal at the position corresponding to the phase difference φ, as shown in FIG. 8.

A count value 210 in the counter 720 shows an amount of the phase sift of the reference signal 300 by the rotary encoder 100. The count value 210 corresponding to the phase difference is processed in an arithmetic circuit 740 to be converted into a position signal. The converted position signal is supplied to a display 780 through a driver 760. The display 780 displays a measured value in a digital manner.

Figure 9A:
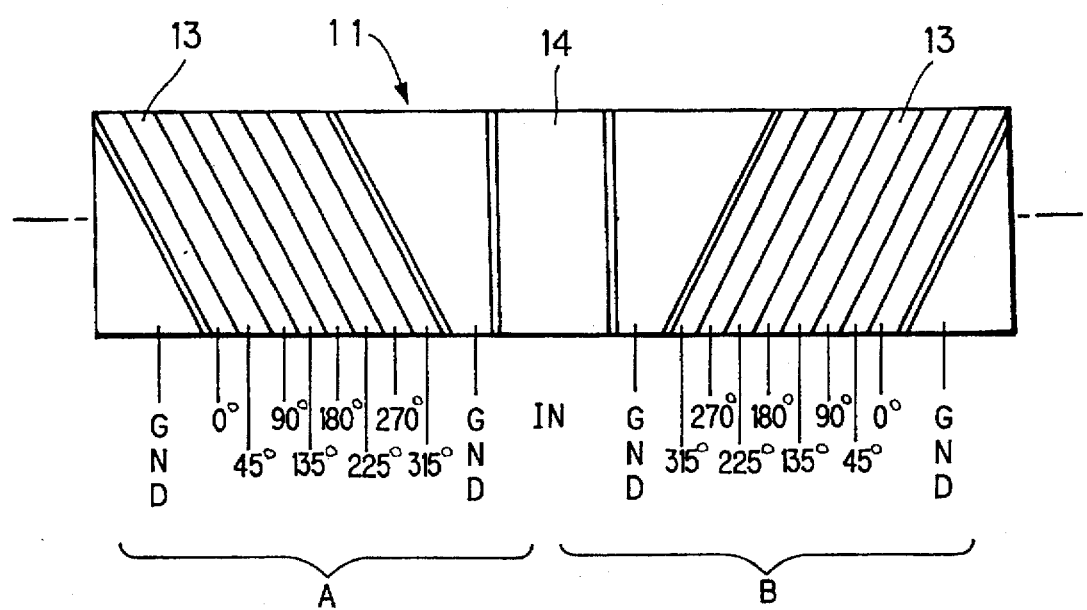
FIG. 9A and FIG. 9B show electrode patterns of a rotary encoders according to another embodiment.
Figure 9B:
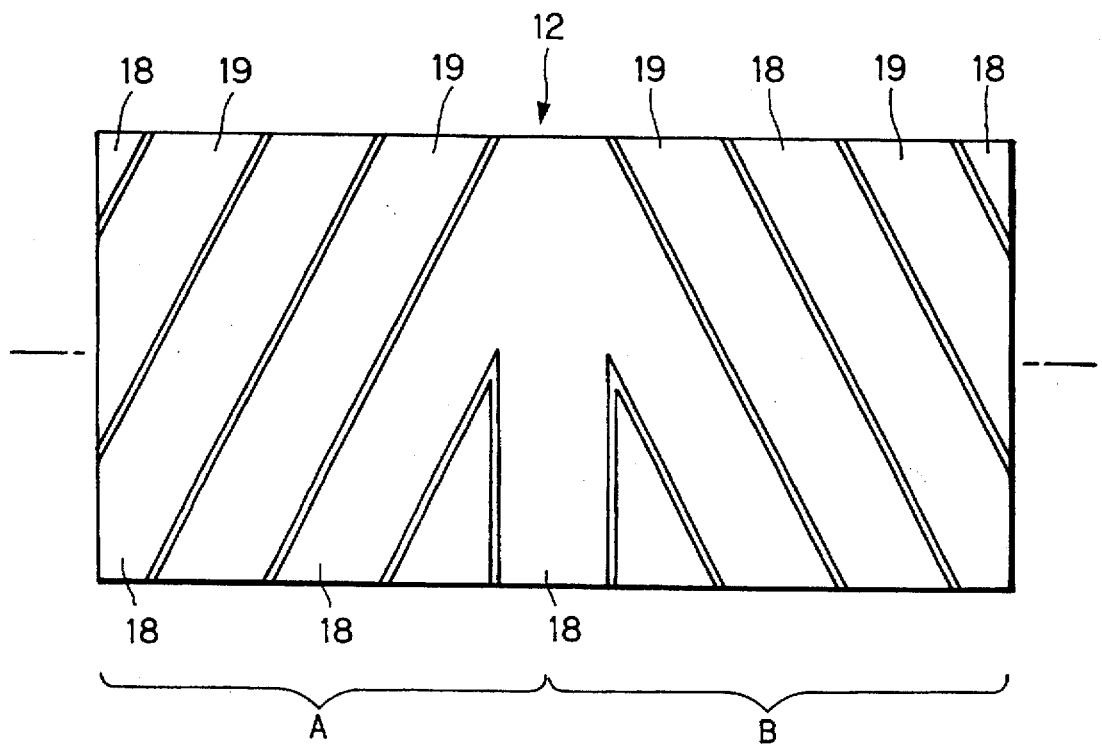

FIGS. 9A and 9B show electrode patterns in a rotary encoder according to another embodiment which has A, B sets of electrode patterns shown in FIGS. 4A and 4B in axial direction. The receiving electrode 14 on the inner surface of the stator 11 is commonly used for A and B sets. The transmitting electrode array 13 in A and B sets have reverse spiral patterns each other. Each corresponding transmitting electrodes 13 in A and B sets is commonly driven by the same phase signal.

Corresponding to the electrode pattern in the stator 11, A and B sets of coupling electrodes 18 are disposed on the outer surface of the rotor 12 in axial direction with reverse spiral patterns each other.

According to the embodiment, the phases of A and B portions change in the same direction in accordance with rotating of the rotor 12. In contrast, the phases of A and B portions change in reverse directions each other in accordance with linear moving of the rotor 12 in axial direction. Therefore, unnecessary phase shifts in A and B sets can be automatically canceled on the output signal. As a result, influence of variation in axial direction can be reduced.

Figure 10A:
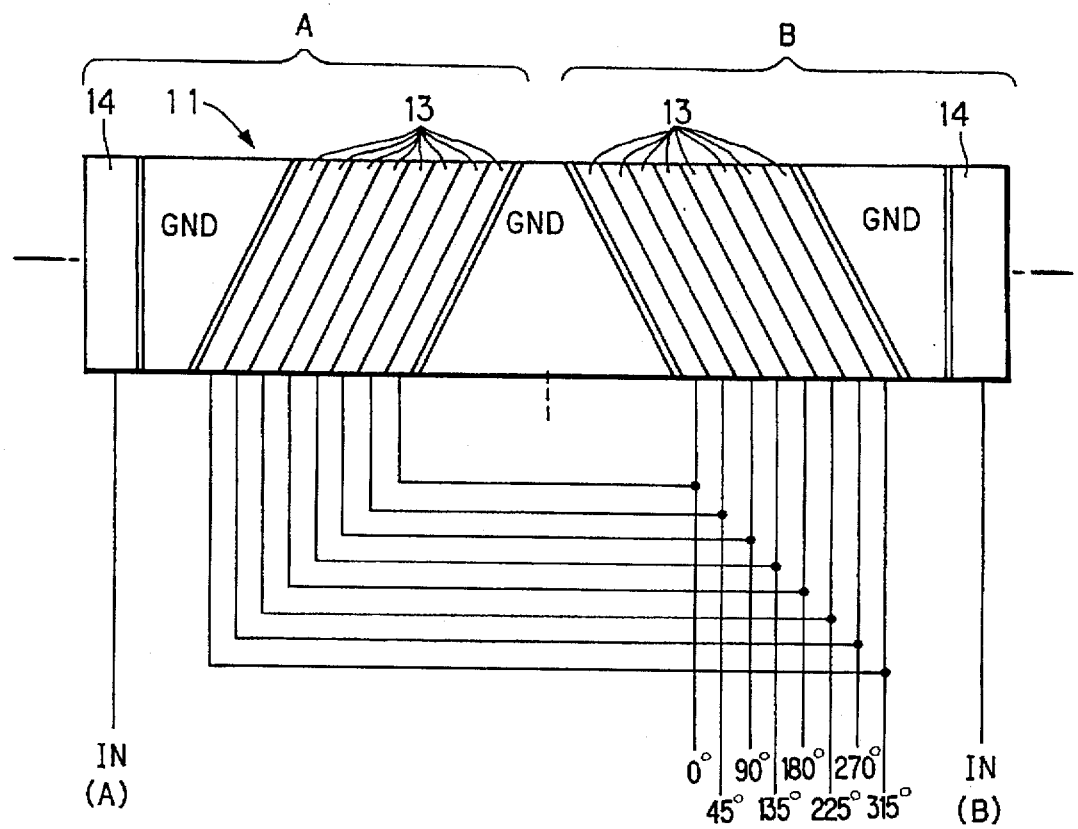
FIG. 10A and FIG. 10B show electrode patterns of a rotary encoder according to another embodiment.
Figure 10B:
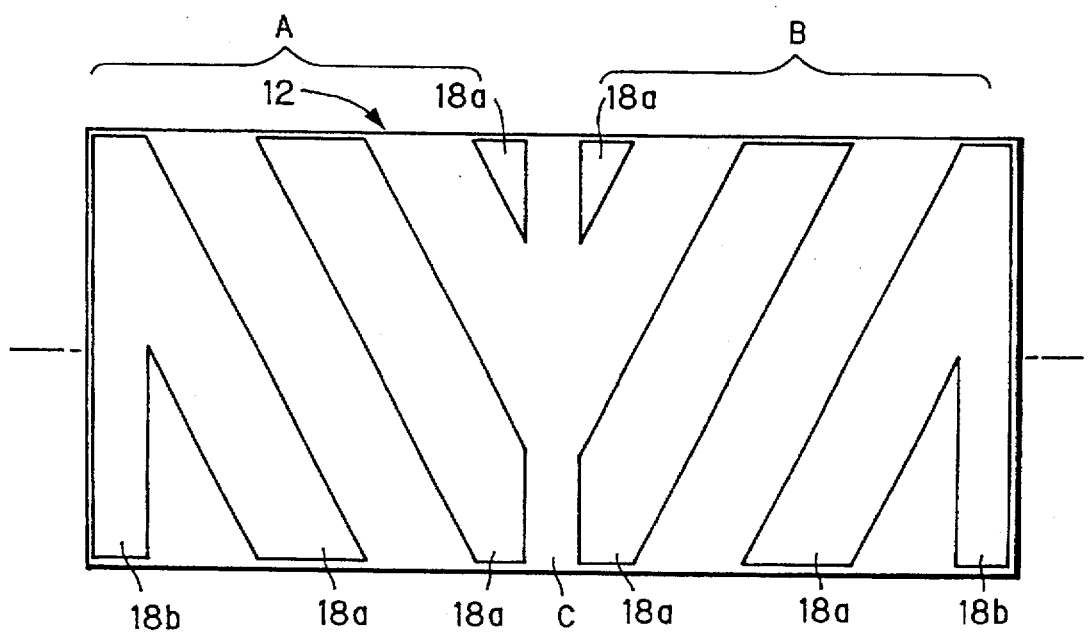

In the embodiment of FIGS. 9A, 9B, the smaller the difference between the signal intensities in A and B portions is, the larger the effect of canceling influence of variation in axial direction is. FIG. 10A and FIG. 10B show electrode patterns according to another embodiment, each corresponding to FIG. 9A and FIG. 9B. In this embodiment, different to FIGS. 9A, 9B, the coupling electrodes 18 are separated from each other between A and B portions, as shown in FIG. 10B, by a separation area C. In accordance with the separation of the coupling electrodes 18, the receiving electrodes 14 in A, B portions on the stator 11 are separated from each other. The output of the receiving electrodes 14 in A, B portions are individually drawn to be processed.

Figure 11:
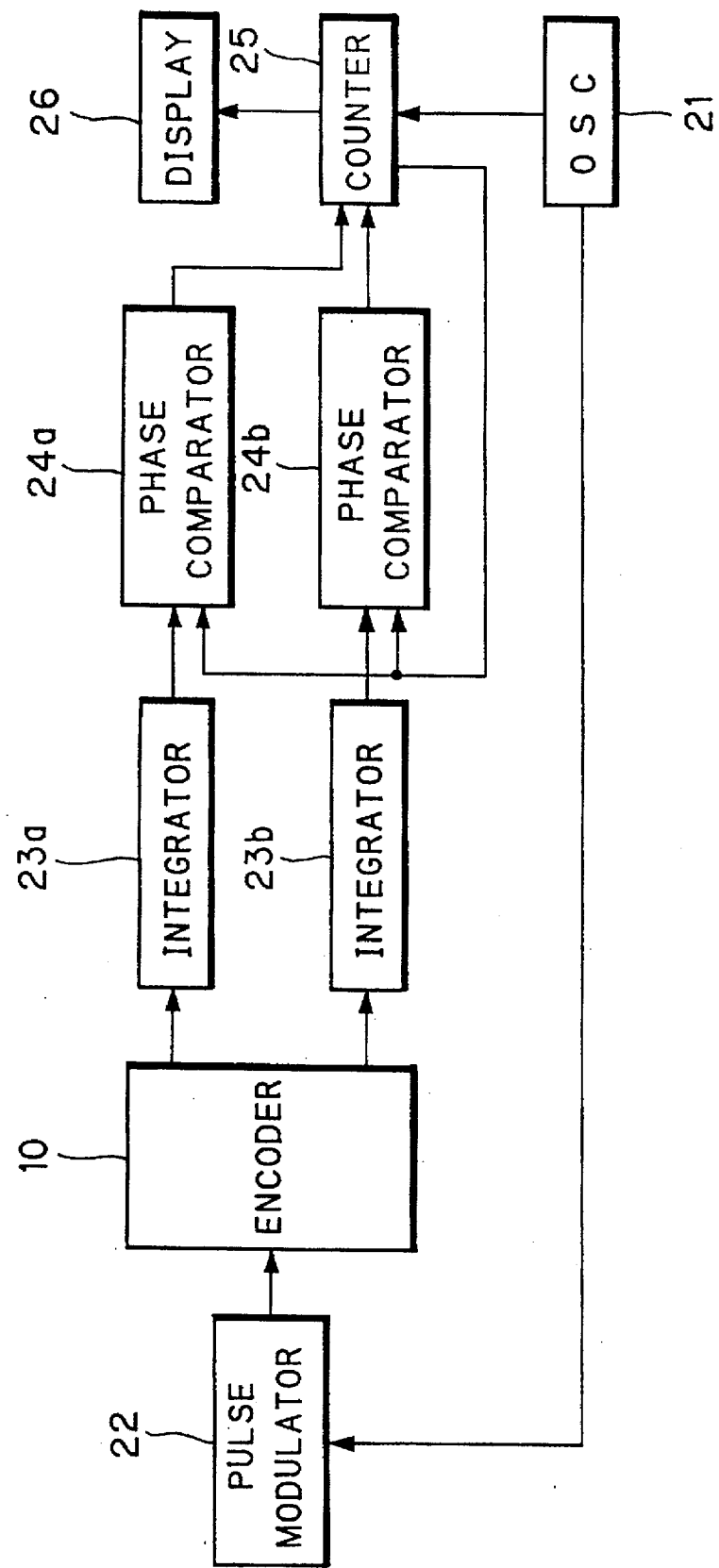
FIG. 11 shows an example of a signal processing circuit of the rotary encoder in FIG. 10.

The measuring circuit used for the embodiment in FIGS. 10A, 10B is shown in FIG. 11. Different from FIG. 3, two outputs from A, B portions of the rotary encoder 10 are integrated by two integrators 23a, 23b, respectively. Two outputs from the integrators 23a, 23b are processed in two phase comparators 24a, 24b, respectively. The counter 25 count clocks from the oscillator 21 in accordance with the detected signals of the phase comparators 24a, 24b to output position data. In the counter 25, the outputs A0, B0, each derived from A, B portions, are equalized to output the resultant signal according to the following formula: (A0+B0)/2.

According to this embodiment, influence of variation in axial direction can be more effectively reduced.

Figure 12A:
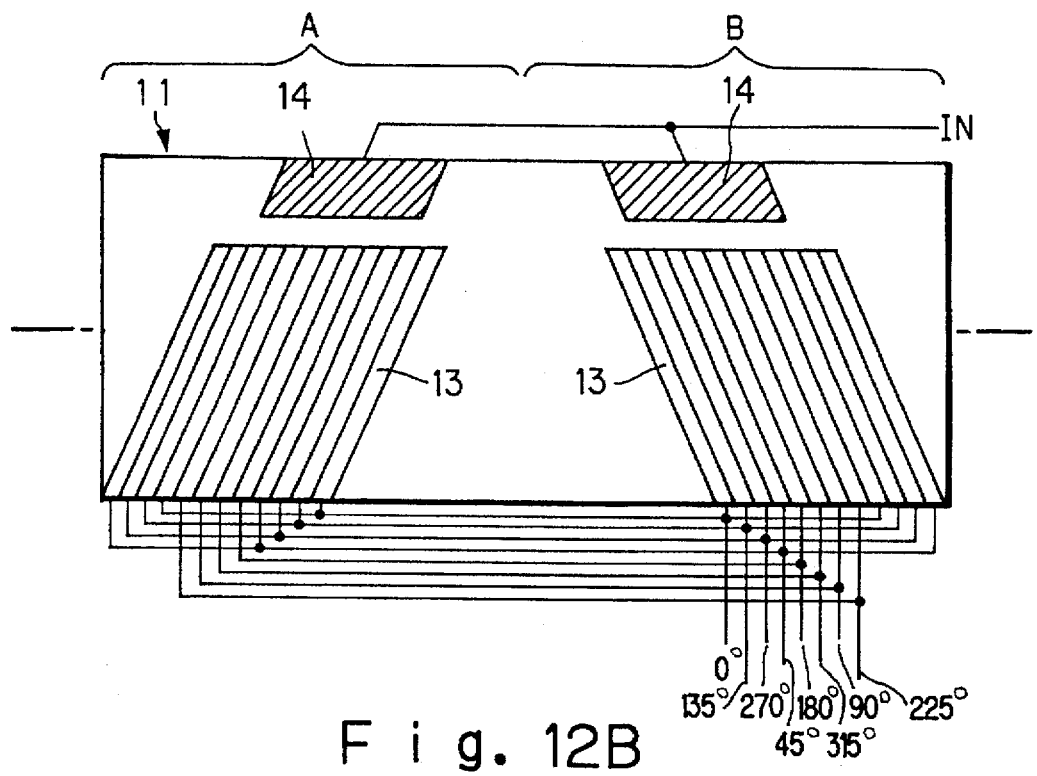
FIG. 12A and FIG. 12B show electrode patterns of a rotary encoder according to another embodiment.
Figure 12B:
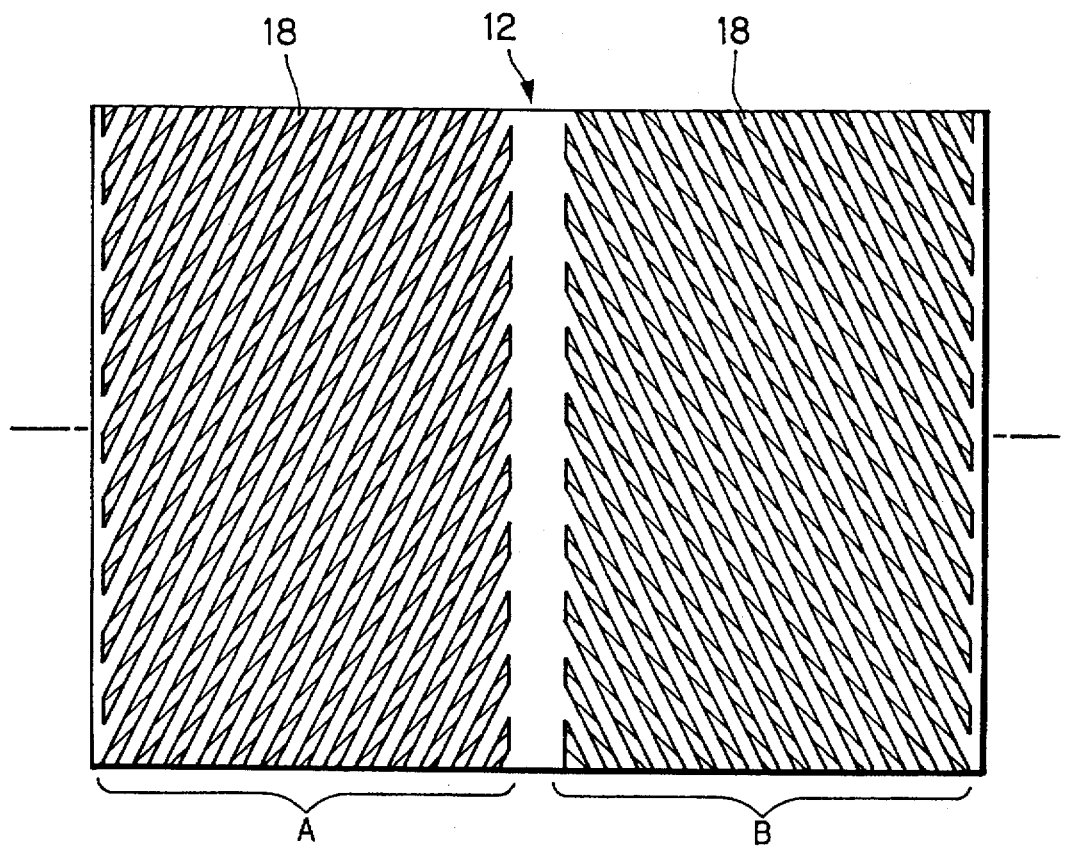

FIGS. 12A and 12B show electrode patterns according to another embodiment which was developed based on the construction in FIGS. 6A and 6B. As shown in FIGS. 12A and 12B, A and B sets of electrode patterns are arranged on the stator 11 and the rotor 12, respectively. The layout of the transmitting electrodes 13 and the receiving electrode 14 on the stator 11 is similar to that of FIG. 5A. In this embodiment, the receiving electrodes 14 in A, B sets are commonly connected to an external measuring circuit as similar to the embodiment of FIGS. 9A and 9B.

Figure 13:
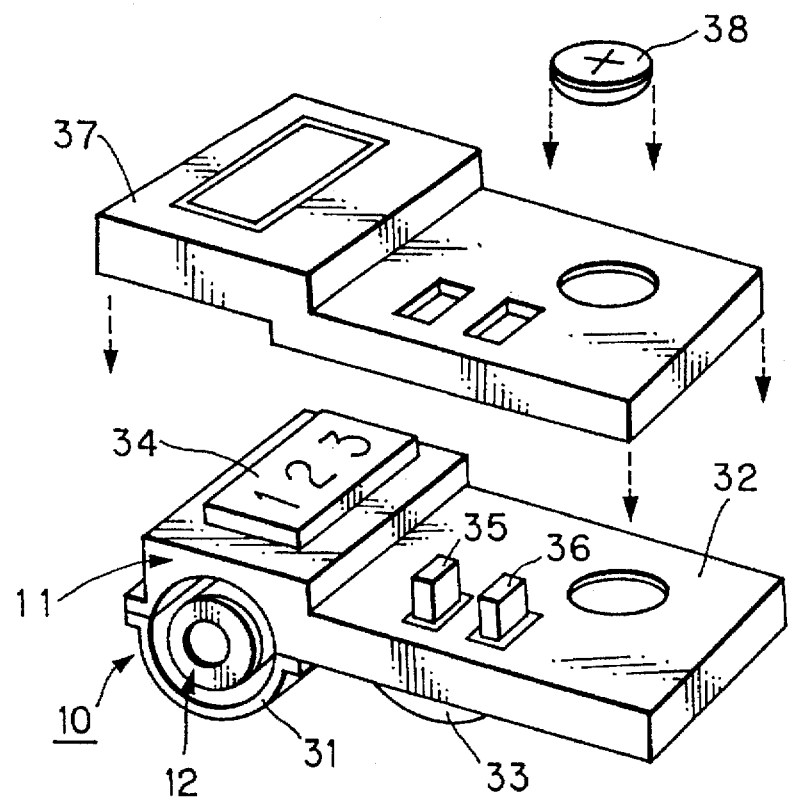
FIG. 13 shows a small measuring device including a rotary encoder according to an embodiment.

FIG. 13 shows a construction of a small measuring apparatus in which the above-described embodiments is applied. The stator 11 and the circuit module 32 are formed of an injection molded plastics product in one body. Therefore, the stator 11 is not an individual halfway cylindrical member, but has a halfway cylindrical inner surface which is opposed to the rotor 12. On the module 32, an LSI 33, an LCD 34, switches 35, 36 and other necessary parts are mounted. The stator 11 has electrode patterns and lead lines formed on the inner surface as similar to the above-described embodiments, and the lead lines are connected to the LSI 33. The electrode patterns can be formed by affixing a FPC substrate, or by machining a metal film directly deposited on the inner surface of the plastic product. The rotor 12 is mounted on a spindle of a to-be-measured machine (not shown) by use of a position-aligning bush 31, then the module 32 is jointed to the bush 31. Finally, a cover 37 and a battery 38 are attached.

As described above, the small displacement measuring device can be easily installed on the to-be-measured machine.

Figure 14:
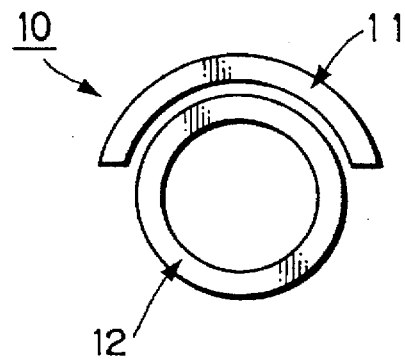
FIG. 14 shows a rotary encoder according to another embodiment.
Figure 15:
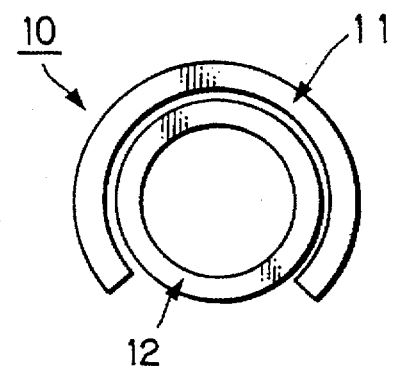
FIG. 15 shows a rotary encoder according to another embodiment.

In the present invention, it is not necessary that the incomplete cylindrical member is a just half cylindrical member. For example, as shown in FIG. 14, an incomplete cylindrical stator 11 smaller than just half of a complete cylindrical member can be used. As shown in FIG. 15, an incomplete stator 11 larger than just half of a complete cylindrical member can be also used. In the device of FIG. 15, the cylindrical rotor 12 can not be inserted in the stator 11 through the side opening, but can be inserted in the stator 11 through the edge opening. In this case, comparing to a case that complete cylindrical member is used, it is more easy to form the electrode patterns and to draw out the lead lines.

Figure 16A:
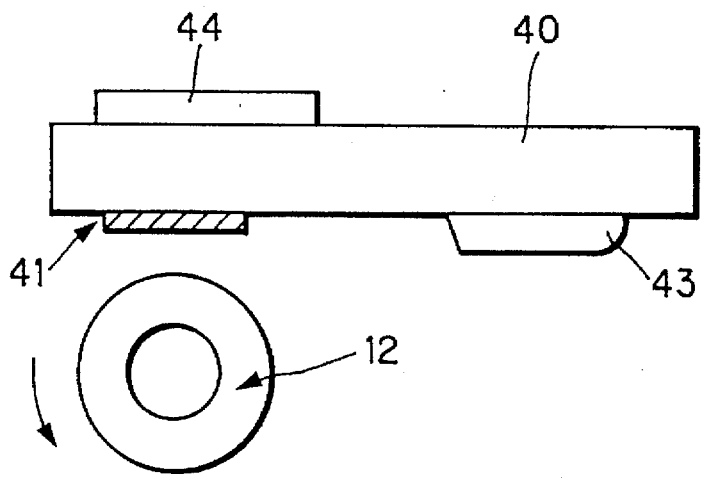
FIG. 16A and FIG. 16B show a small measuring device including a rotary encoder according to an embodiment.
Figure 16B:
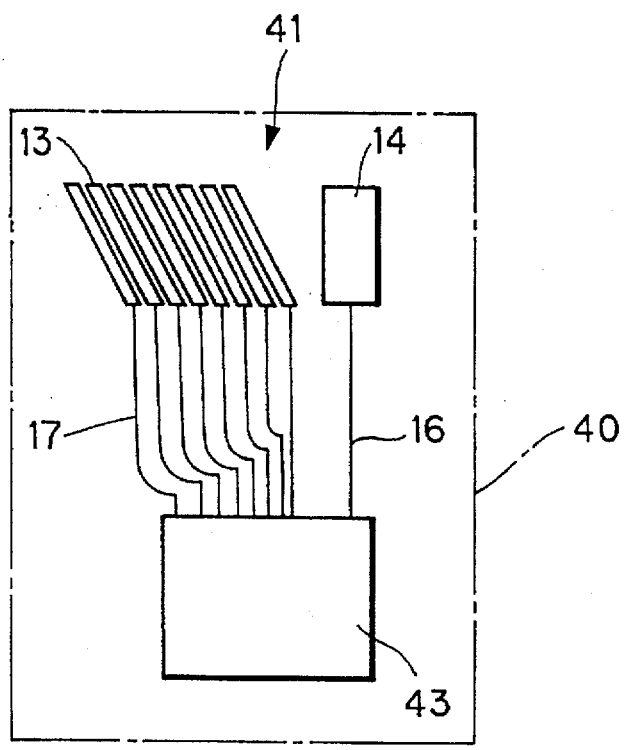

FIGS. 16A and 16B show another embodiment in which a stator is formed on a plate. As shown in FIG. 16A, a stator portion 41 is formed on a plate 40. The stator portion 41 has, as shown in FIG. 16B, the same transmitting electrode array 13 and the receiving electrode 14 as FIG. 4A by sputtering and etching processes. On the plate 40, lead lines 16, 17 continued from the stator portion 41 are also formed at the same time in the above-described processes.

An LSI 43 and an LCD 44 are mounted on the plate 40. Electric wires connecting between the LSI 43 and the LCD 44 are not shown, but formed on the plate 40. The rotor 12 is disposed to be opposed to the stator portion 41, as shown in FIG. 16A. On the rotor 12, the coupling electrode are formed similar to FIG. 4B.

According to the embodiment, it is not necessary to use a FPC substrate for the stator portion 41. It is able to form the stator portion 40 by use of conventional techniques, sputtering, vapor deposition, etching, and the like. As a result, the manufacturing cost can be reduced. The device assembling is easy.

Figure 17A:
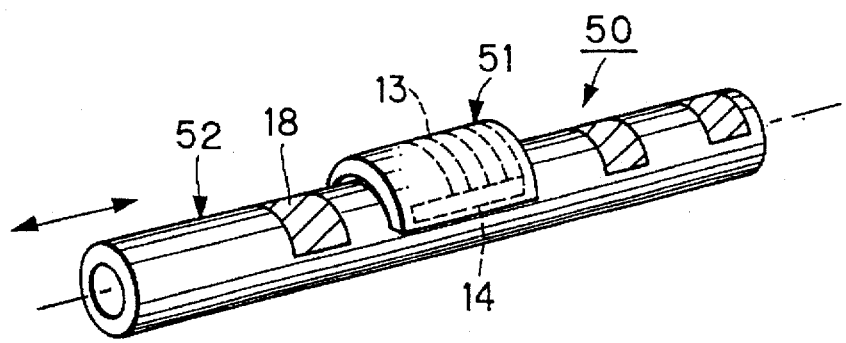
FIG. 17A to FIG. 17C show a linear encoder according to another embodiment.
Figure 17B:
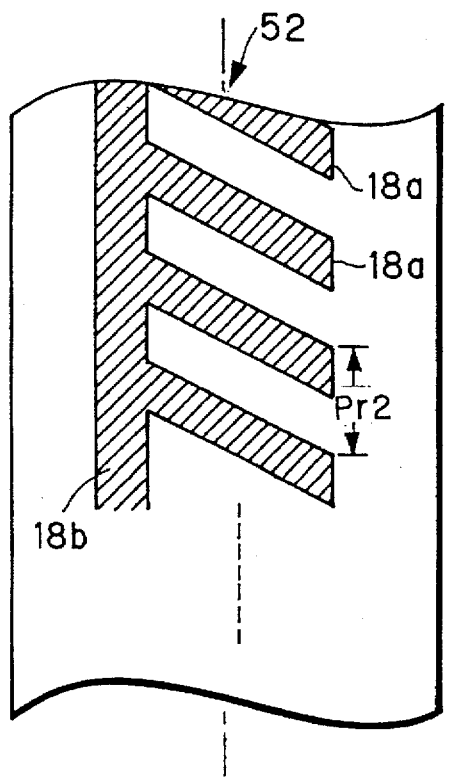
Figure 17C:
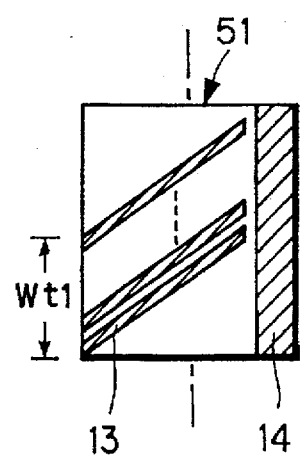

FIGS. 17A to 17c show another embodiment applied to a linear encoder. FIG. 17A is a plan view of the linear encoder 50. The linear encoder 50 has a halfway cylindrical scale 51 and a cylindrical scale 52 as similar to the above-described rotary encoder. FIGS. 17B and 17C are electrode patterns on the scale 52 and the scale 51 rolled out, respectively. The scale 52 is longer than the scale 51. The scale 52 is prevented from relative moving in angular direction to the scale 51, and movable only in axial direction, as shown by an arrow.

As formed on the inner surface of the halfway cylindrical scale 51, as shown in FIG. 17C, are eight transmitting electrodes 13 and a receiving electrode 14. The transmitting electrodes 13 have spiral patterns. Although only one unit of transmitting electrodes 13 corresponding to a transmitting wavelength pitch Wt1 is shown in FIG. 17C, plural units of the transmitting electrodes can be arranged. The receiving electrode 14 is formed near to the transmitting electrodes 13 with a rectangular pattern longitudinal in axial direction.

On the outer surface of the scale 52, as shown in FIG. 17B, a plurality of receiving portions 18a of the coupling electrode 18 are formed with spiral patterns having the same lead angle as the transmitting electrodes 13 at pitch Pr2 (=Wt1) in axial direction. Each receiving portion 18a is capacitively coupled to four transmitting electrodes 13. The transmitting portion 18b of the coupling electrode 18 which is capacitively coupled to the receiving electrode 14 is formed with an elongated pattern in axial direction. The coupling electrode 18 can be formed of a continuing spiral pattern surrounding the scale 52.

Figure 29:
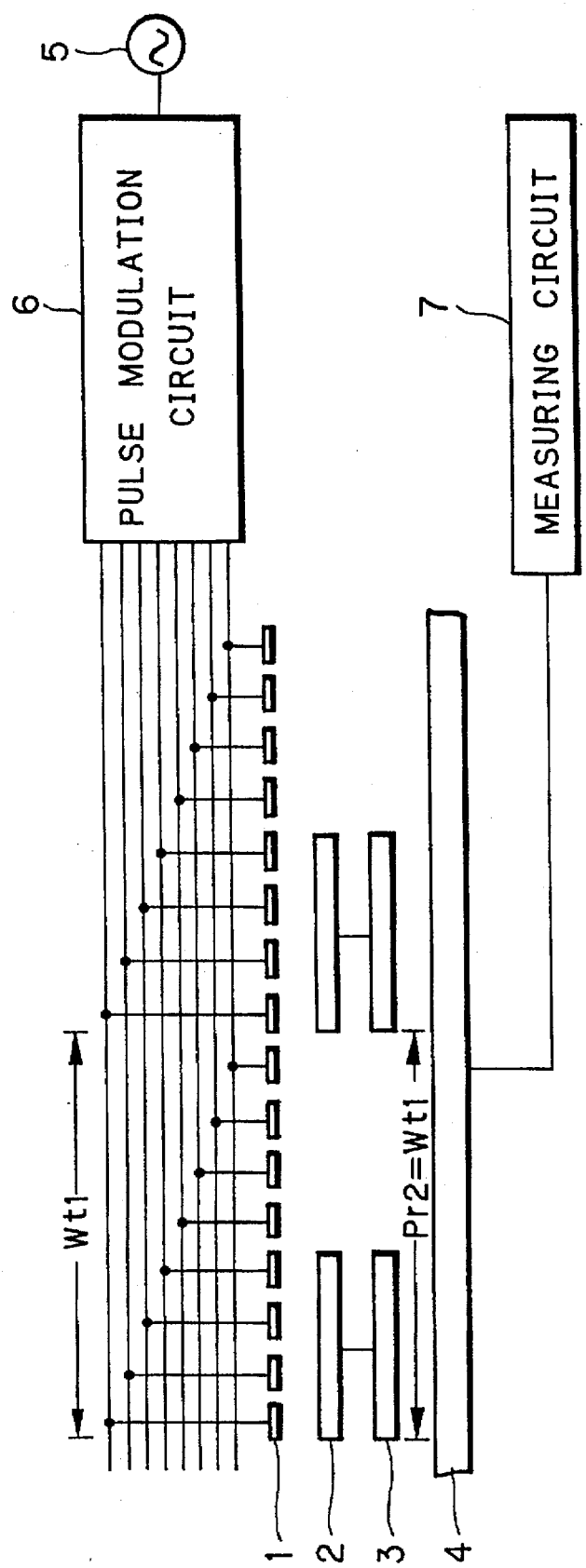
FIG. 29 shows a principle for constructing a conventional encoder.

The linear encoder has a different construction from the conventional encoder, but the principle of the construction is the same as that of FIG. 29. Therefore, it is able to measure the linear displacement of the scale 52 relatively moving to the scale 51 in axial direction.

Figure 18A:
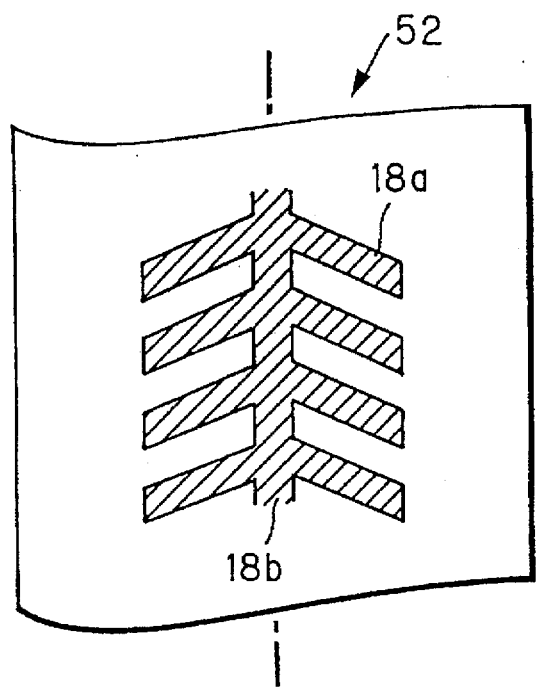
FIG. 18A and FIG. 18B show electrode patterns of a linear encoder according to another embodiment.
Figure 18B:
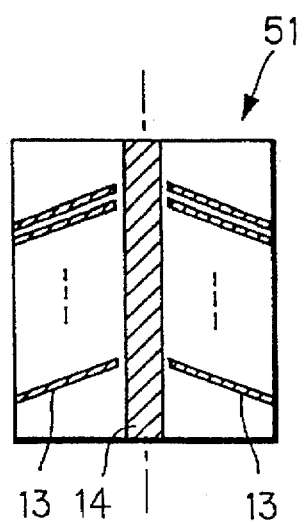

FIGS. 18A and 18B show another embodiment which have two sets of electrode patterns shown in FIGS. 17B and 17C in angular direction. According to this embodiment, influence of axial misalignment between the scales 51 and 52 can be reduced.

Several embodiments combining cylindrical members and halfway cylindrical members have been described so far. Next, rotary encoders which have two complete cylindrical members will be described.

Figure 19A:
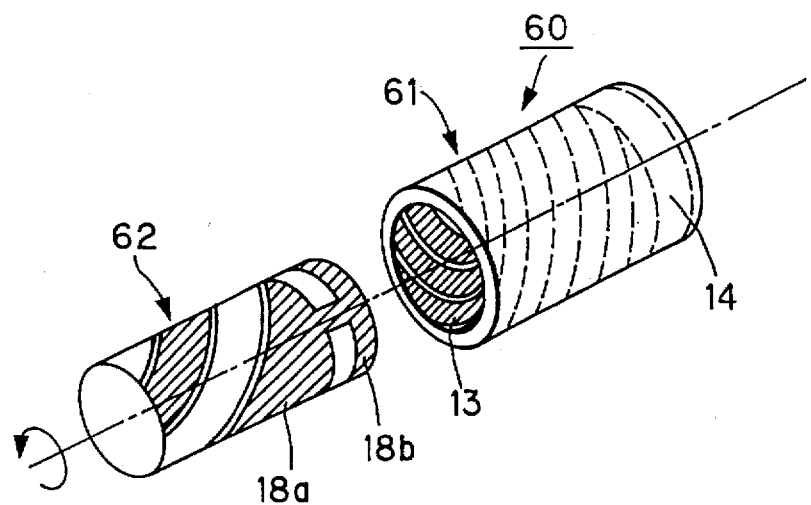
FIG. 19A to FIG. 19C show a rotary encoder according to another embodiment.
Figure 19B:
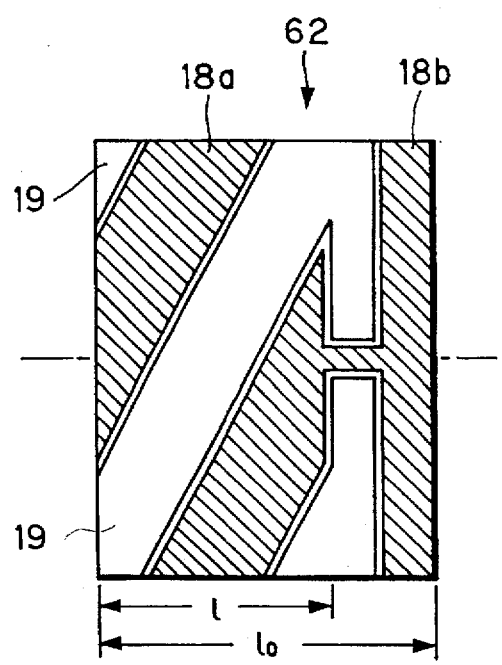
Figure 19C:
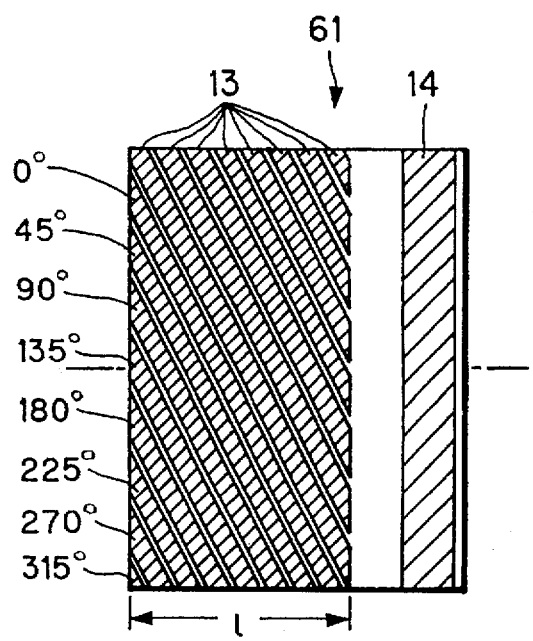

FIG. 19A shows a rotary encoder 60 according to one embodiment. The encoder 60 is composed of a rotor 62 and a stator 61 surrounding the rotor 62. The rotor 62 is assembled to be coaxial with the stator 61 with a predetermined gap so as to movable only in angular direction relative to the stator 61. FIGS. 19B and 19C show the rolled out outer surface of the rotor 62 and the rolled out inner surface of the stator 61, respectively.

As shown in FIG. 19C, the transmitting electrode array 13 and the receiving electrode 14 are formed on the cylindrical inner surface of the stator 61 as similar to FIG. 4A. The transmitting electrode array 13 has one set of eight electrodes formed of spiral patterns with a predetermined lead angle at a predetermined pitch from one end of the stator 61. The receiving electrodes 14 is formed of a rectangular pattern longitudinal in angular direction, at the other end of the stator 61. Both of the transmitting electrodes 13 and the receiving electrode 14 take a round on the inner surface of the stator 61.

As shown in FIG. 19B, a coupling electrode 18 capacitively coupled to the transmitting electrodes 13 and the receiving electrode 14 are formed on the outer surface of the rotor 62. The coupling electrode 18 has a receiving portion 18a capacitively coupled to the transmitting electrodes 13 and a transmitting portion 18b capacitively coupled to the receiving electrode 14. The receiving portion 18a has a spiral pattern with the same lead angle as the transmitting electrodes 13 and covers four transmitting electrodes 13. The transmitting portion 18b of a rectangular pattern takes a round on the outer surface.

Although a grounded electrode 19 is formed on the space between the coupling electrode 18, the grounded electrode 19 can be omitted.

The transmitting electrodes 13 and the receiving electrode 14 are drawn out by a predetermined lead lines (not shown) to be connected to a driving/measuring circuit. Alternating signals which are phase shifted by 45° each other are supplied in numerical sequence to the transmitting electrodes 13 as similar to FIG. 4A.

In this embodiment, one revolution 2πr of the outer surface of the rotor 12 is equal to the transmitting wavelength pitch Wt1 and the receiving electrode pitch Pr2 shown in FIG. 29. As a result, according to this embodiment, it is able to measure the angular displacement with a high precise of πr/8 or more.

According to the embodiment, there is no influence from axial misalignment between the stator 61 and the rotor 62. Because, one unit of the spiral electrodes are formed round the surface, the averaged intensity of the output signal is equalized in angular direction.

Figure 20A:
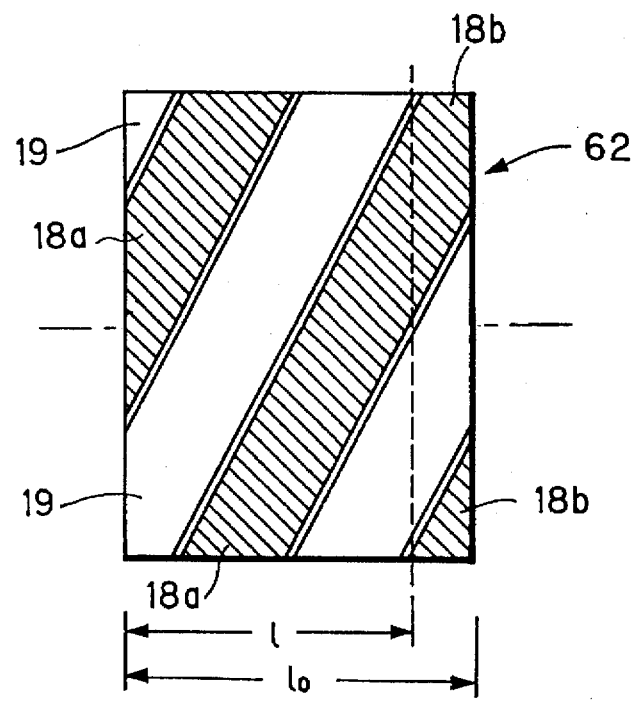
FIG. 20 and FIG. 20B show electrode patterns of a rotary encoder according to another embodiment.
Figure 20B:
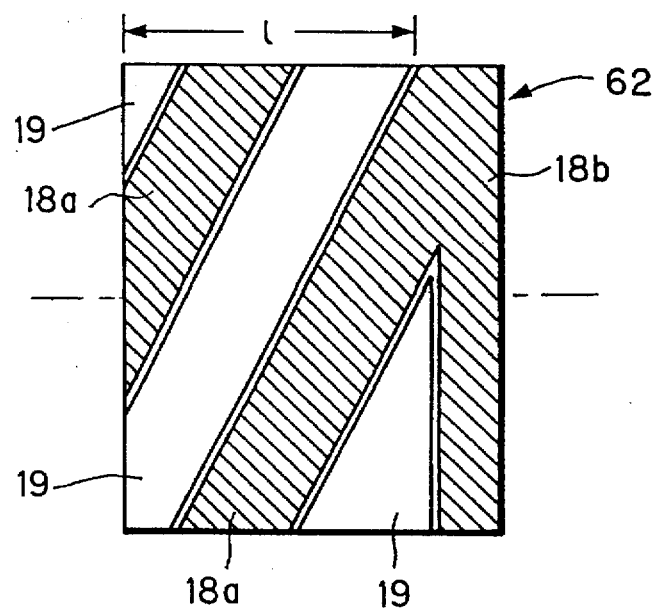

FIGS. 20A and 20B show another electrode patterns of the stator 62. In FIG. 20A, the transmitting portion 18b of the coupling electrode 18 is formed of a spiral pattern elongated from the spiral receiving portion 18a similar to that of FIG. 5B. In FIG. 20B, the transmitting portion 18b is formed as the same pattern as FIG. 19B, and continued to the receiving portion 18a without an especial space between the transmitting portion 18b and the receiving portion 18a.

According to the electrode patterns in FIG. 20A, comparing to FIG. 19B, misalignment in axial direction of the stator 61 relative to the rotor 62 such as might be caused of sensor clearances is allowable. Because, in contrast to that the receiving portion 18a is formed within the width $1(<1_0)$ in FIG. 19B, the coupling electrode 18 in FIG. 20A works as receiving portions as a whole in the width 10 in axial direction. Further, since the electrode patterns are simple, the manufacturing process of the electrode patterns becomes easy. However, the area of the transmitting portion 18b actually opposed to the receiving electrode 14 is approximately half of that in FIG. 19B.

According to the electrode patterns in FIG. 20B, not only misalignment in axial direction of the stator 61 relative to the rotor 62 is allowable, but also the area of the transmitting portion 18b opposed to the receiving electrode 14 is secured to be sufficiently large.

Figure 21A:
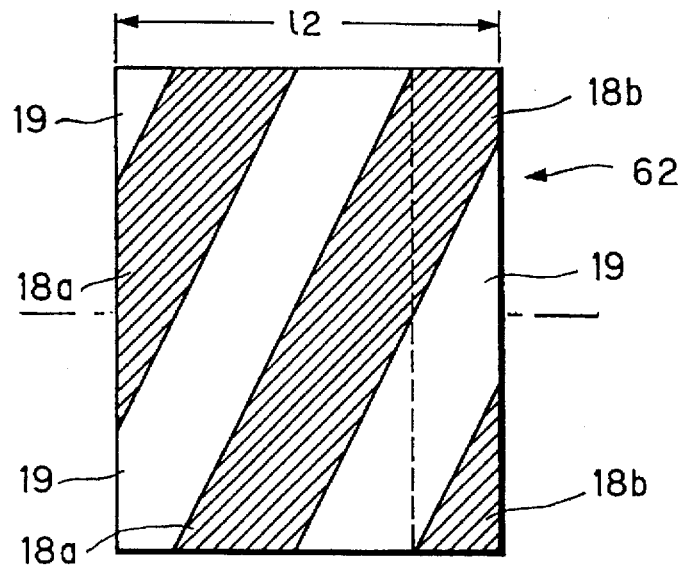
FIG. 21A and FIG. 21B show electrode patterns of a rotary encoder according to another embodiment.
Figure 21B:
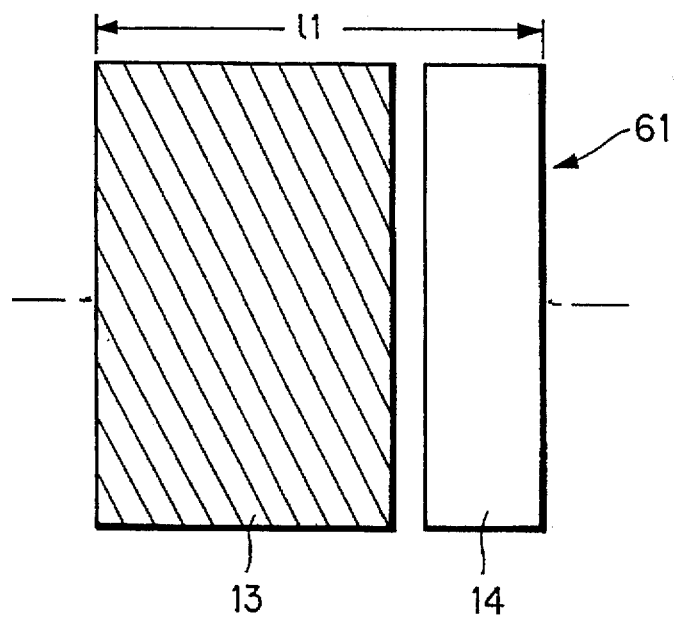

FIGS. 21A and 21B are another electrode patterns corresponding to FIGS. 19A and 19B, respectively. In this embodiment, the length $l_2$ of the rotor 62 is smaller than the length $l_1$ of the stator 61. The electrode patterns on the rotor 62 are the same as that of FIG. 20A, and the electrode patterns on the stator 61 are the same as that of FIG. 19C.

As a result of applying the above relations, the drawing of lead lines from the stator 61 becomes easy. Further, misalignment between the stator 61 and rotor 62 in axial direction is allowable.

Figure 22A:
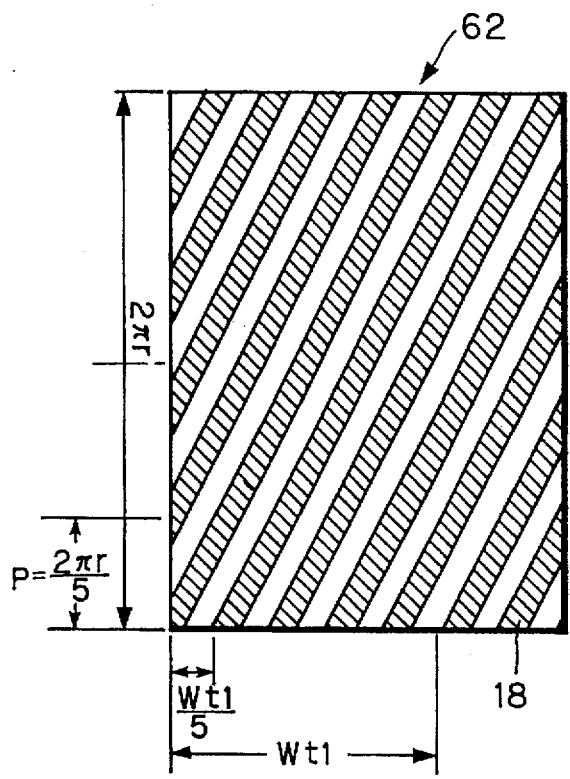
FIG. 22A and FIG. 22B show electrode patterns of a rotary encoder according to another embodiment.
Figure 22B:
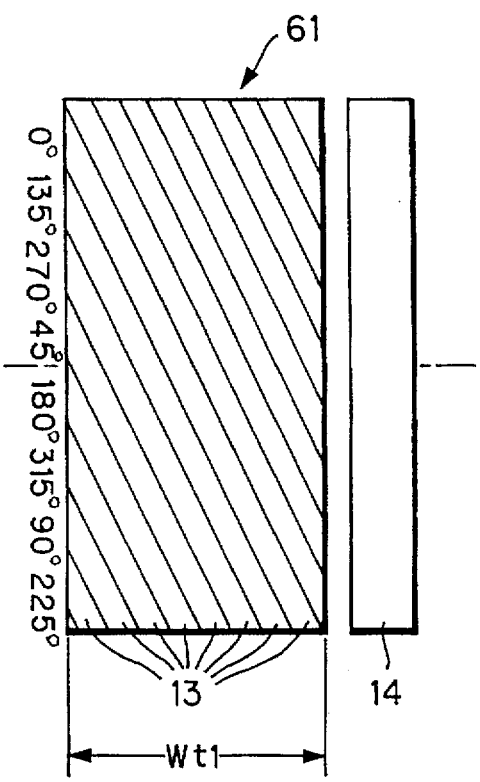

FIGS. 22A and 22B show another electrode patterns of a developed embodiment corresponding to FIGS. 19A and 19B. In this embodiment, the coupling electrode 18 is divided into 5 (generally, an integer greater than 2) electrodes uniformly spaced with a pitch obtained by dividing the transmitting wavelength Wt1 by 5. Then these electrodes are disposed at a pitch of 2πr/10 with spiral patterns. Although eight transmitting electrodes 13 have the same patterns as that in FIG. 19C, the phases of alternating signals are different from that in FIG. 19C. Alternatively, eight phases alternating signals whose phases are sequentially shifted by 135° are supplied to the transmitting electrodes 13, as shown in FIG. 22B.

According to this embodiment, when the rotor 62 rotates ⅕ revolution (i.e., 72°), the phase change of the output signal is just 360°. In other words, when the rotor 62 rotates one revolution, the output signal changes for 5 periods. The principle of the measuring method and the detailed measuring circuit in the above-mentioned embodiment in FIGS. 6A and 6B.

Figure 23:
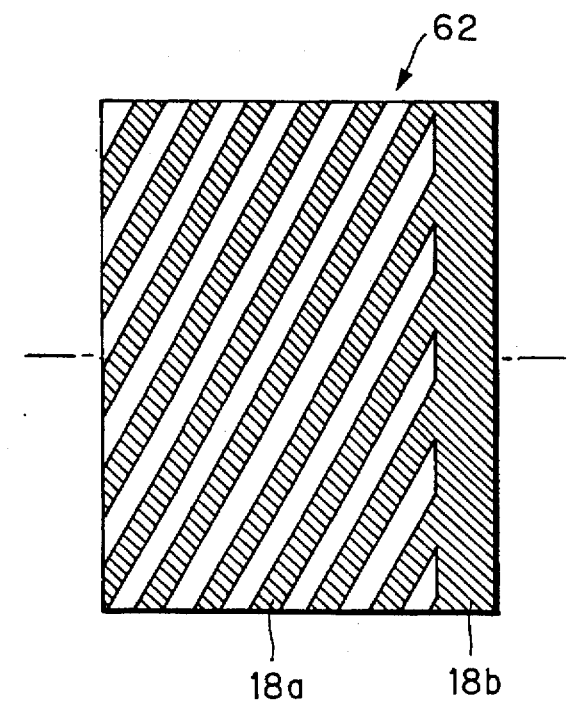
FIG. 23 shows electrode patterns of a rotary encoder according to another embodiment.

In FIG. 22A, the coupling electrodes 18 are formed of only spiral patterns including the receiving portions and the transmitting portions. In contrast, it is able to use the electrode patterns shown in FIG. 23 such as the receiving portions 18a are formed of spiral patterns, and the transmitting portion 18b is formed of a rectangular pattern longitudinal in angular direction. As a result, the coupling electrodes 18 can be opposed to the receiving electrode 14 on the stator 61 with a large area.

Figure 24A:
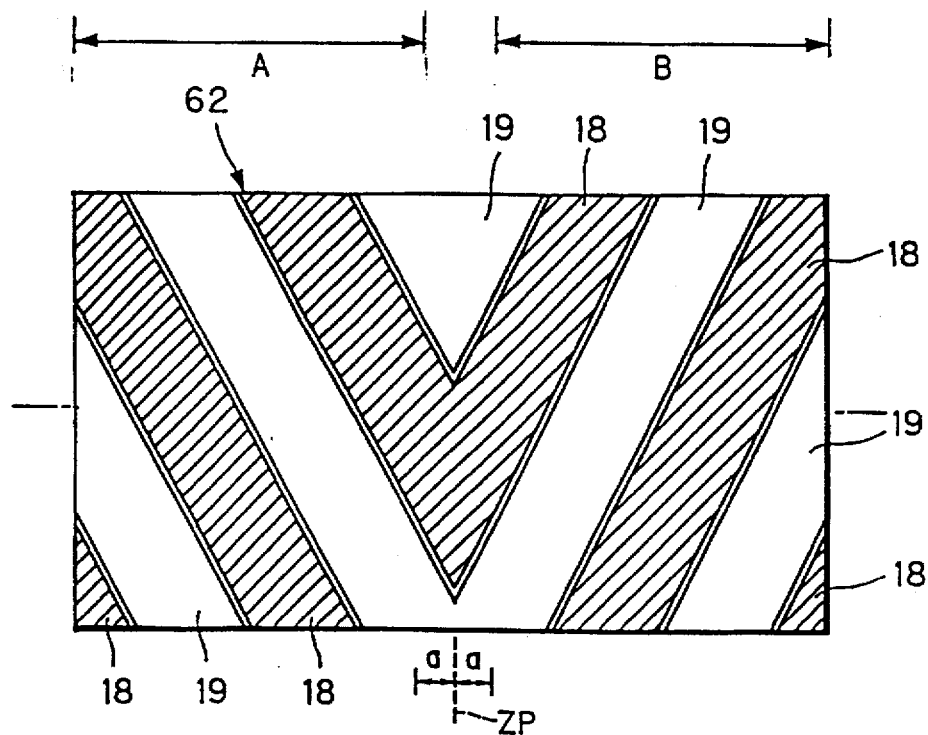
FIG. 24A and FIG. 24B show electrode patterns of a rotary encoder according another embodiment.
Figure 24B:
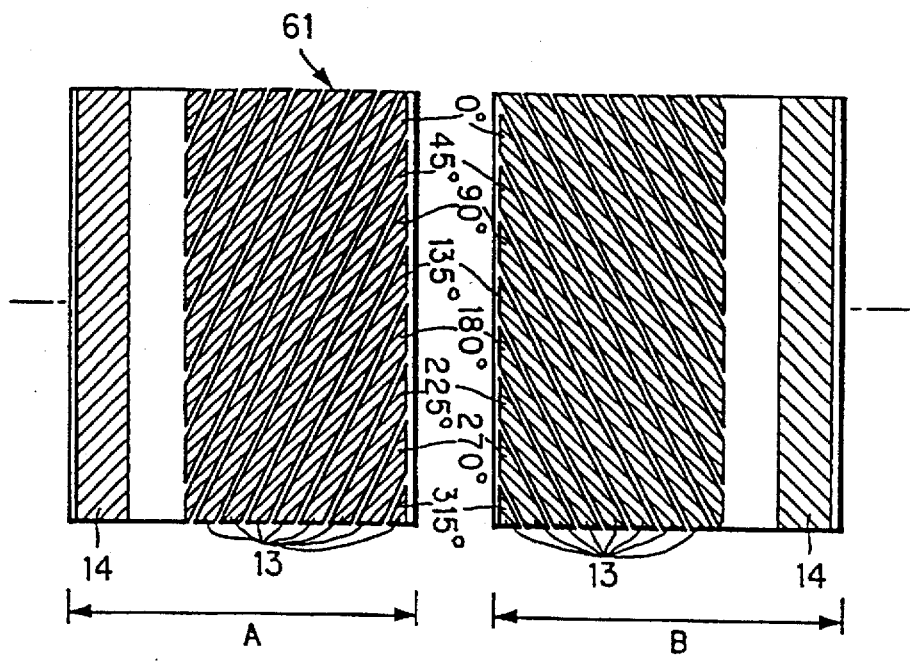

FIGS. 24A and 24B show electrode patterns of a rotary encoder according to another embodiment which has A, B sets of electrode patterns shown in FIGS. 21A and 21B in axial direction. As formed on the stator 61, are two sets of the transmitting electrode array 13 and the receiving electrode 14 having reverse patterns each other. There is a space of 2a between A and B sets such that misalignment in axial direction is allowable with respect to the reference point ZP. Each corresponding transmitting electrodes 13 in A and B sets is commonly driven by the same phase signal. The receiving electrodes 14 in A, B sets are commonly connected to the measuring circuit.

Corresponding to the electrode pattern in the stator 61, A and B sets of coupling electrodes 18 are disposed on the outer surface of the rotor 62 in axial direction with reverse spiral patterns each other.

According to the embodiment, the phases of A and B portions change in the same direction in accordance with the rotating of the rotor 62. In contrast, the phases of A and B portions change in reverse directions each other in accordance with linear moving of the rotor 62 in axial direction. However, if the linear movement is limited within 2a, the above phase changes of A and B portions are canceled in the output signal. As a result, influence of variation in axial direction can be reduced.

In the above embodiment, the space 2a between A, B portions can be laid not on the stator 61, but between the two sets of the coupling electrodes 18 on the rotor 62.

Figure 25A:
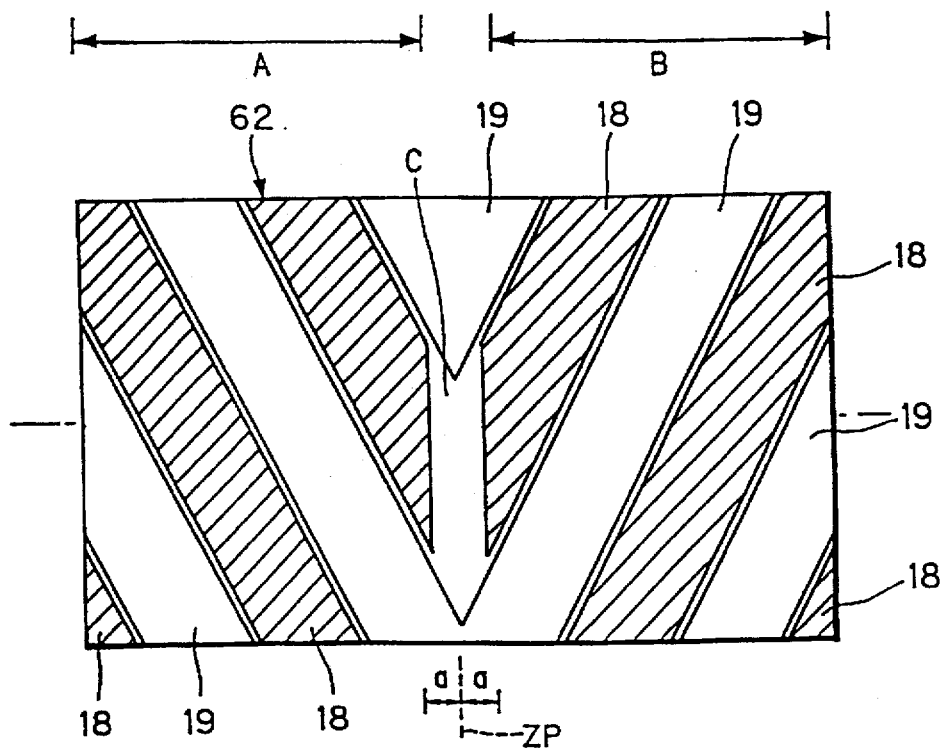
FIG. 25A and FIG. 25B show electrode patterns of a rotary encoder according to another embodiment.
Figure 25B:
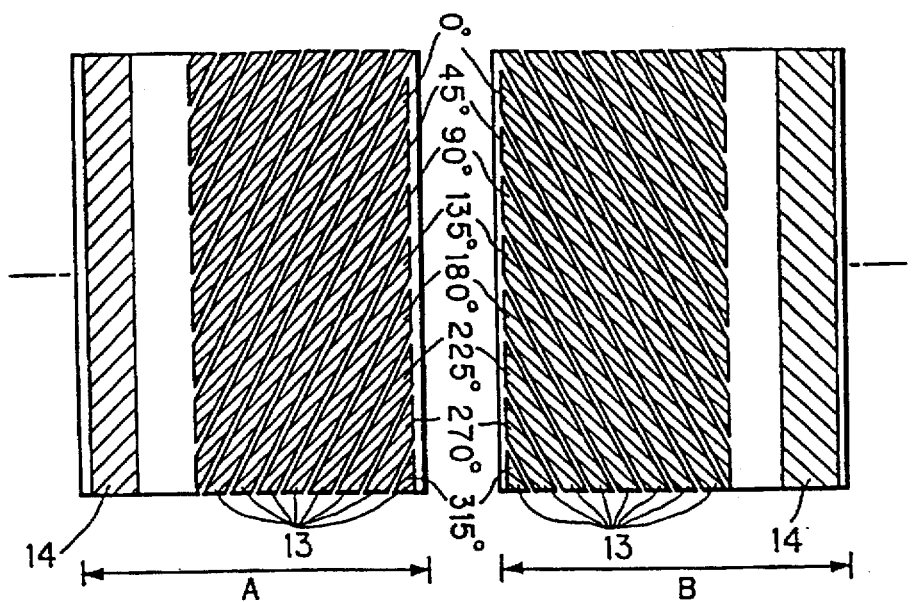

FIGS. 25A and 25B show electrode patterns according to another embodiment, each corresponding to FIGS. 24A and 24B, in which variation of signal intensity between A and B portions is more allowable. In this embodiment, different to FIGS. 24A, 24B, the coupling electrodes 18 are separated from each other between A and B portions, as shown in FIG. 25A as separation area C. In accordance with the separation of the coupling electrodes 18, the receiving electrodes 14 in A, B portions on the stator 61 are separated from each other. The output of the receiving electrodes 14 in A, B portions are individually drawn to be processed.

The measuring circuit used in this embodiment is the same as FIG. 11. As a result of averaging process in the measuring circuit, influence of variation in axial direction can be more effectively reduced.

Figure 26A:
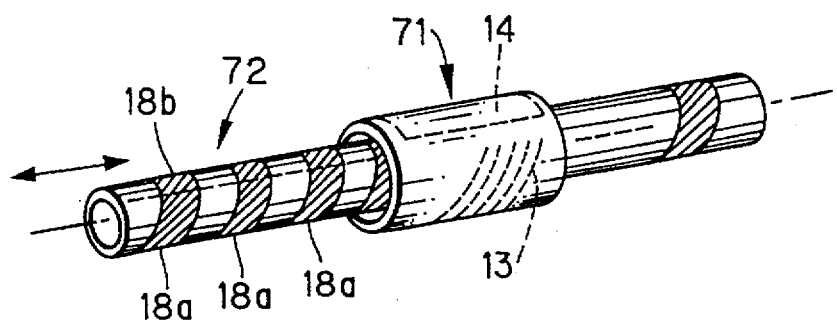
FIG. 26A to FIG. 26C show a linear encoder according another embodiment.
Figure 26B:
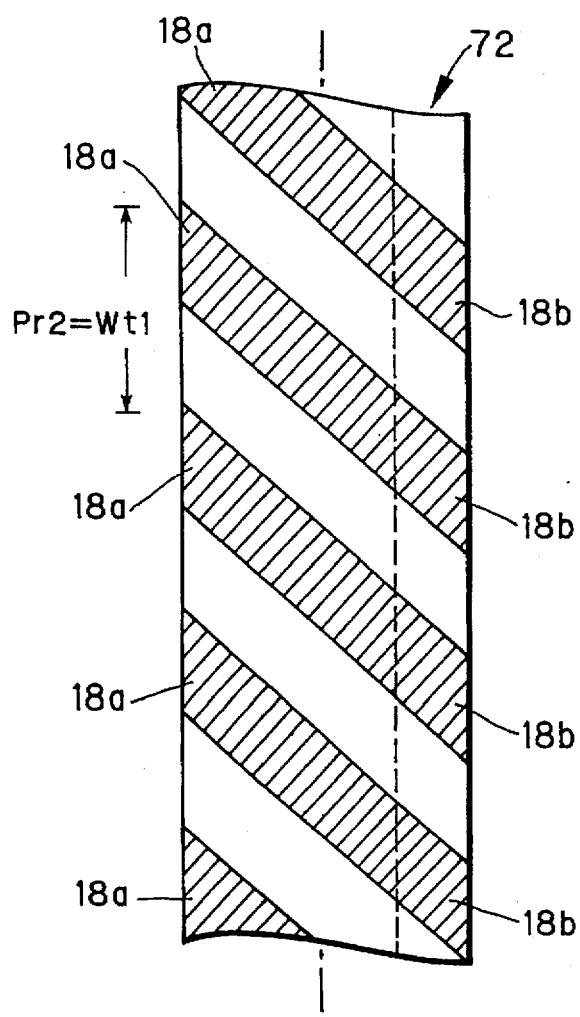
Figure 26C:
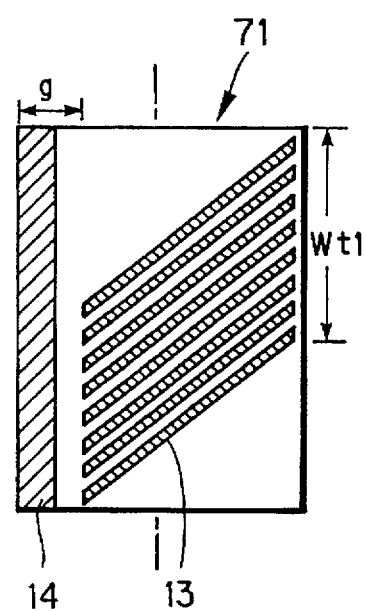

FIGS. 26A to 26C show a linear encoder with two cylindrical members according to another embodiment. FIG. 26A is a perspective view of the linear encoder. This encoder has a first cylindrical scale 71 and a second cylindrical scale 72 which are coaxial. The second scale 72 is longer than the first scale 71 and secured by a predetermined mechanism (not shown) so as to be relatively displaceable to the first scale 71 only in axial direction as shown by an arrow.

FIGS. 26B and 26C are electrode patterns on the second scale 72 and the first scale 71 rolled out, respectively.

The first scale 71 has, as shown in FIG. 26C, eight transmitting electrodes 13 and a receiving electrode 14 formed on the cylindrical inner surface. The transmitting electrodes 13 are disposed with spiral patterns outside a gap region of g. Although only one unit of eight transmitting electrodes 13 corresponding to a transmitting wavelength pitch Wt1 is shown in FIG. 26C, plural units of the transmitting electrodes can be arranged. The receiving electrode 14 is formed with a rectangular pattern longitudinal in axial direction in the gap region of g.

On the cylindrical outer surface of the second scale 72, as shown in FIG. 26B, a plurality of coupling electrodes 18 are formed with spiral patterns having the same lead angle as the transmitting electrodes 13 at pitch Pr2 (=Wt1) in axial direction. Each coupling electrode 18 has a receiving portion 18a capacitively coupled to four transmitting electrodes 13 and a transmitting portion 18b capacitively coupled to the receiving electrode 14.

The linear encoder has a different construction from the conventional encoder, but the principle of the construction is the same as that of FIG. 29. Therefore, it is able to measure the linear displacement of the scale 72 relatively moving to the scale 71 in axial direction.

In the above-described embodiments, electrode patterns on the inner and outer surfaces of the cylindrical or halfway cylindrical members are formed of FPC substrates. In the case, optional insulator or metal material is used for the cylindrical or the halfway cylindrical member.

Figure 27A:
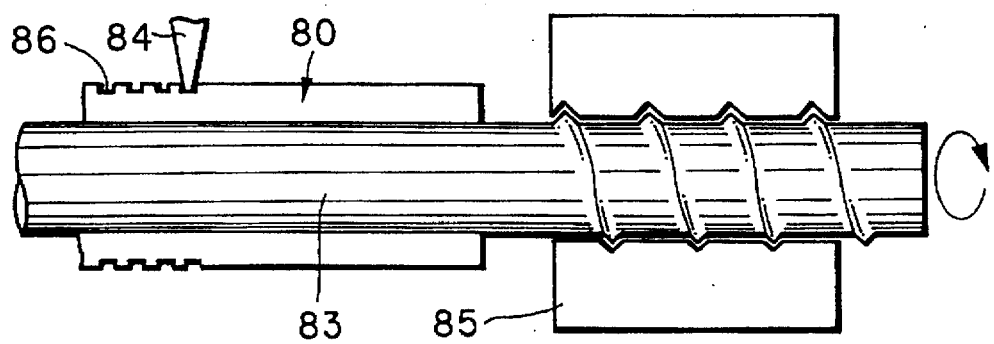
FIG. 27A and FIG. 27B show a method for forming electrode patterns on the outer surface of the cylinder.
Figure 27B:
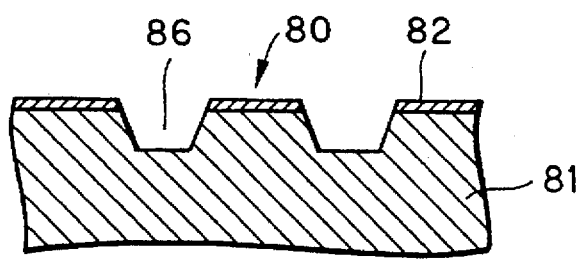

FIGS. 27A and 27B show another method for forming spiral electrode patterns on a outer surface of a cylindrical member 80. As shown in the expanded section in FIG. 27B, the cylindrical member 80 is formed of an injection molded plastic body 81, on whose outer surface a conductive film 82, for example, Au,Ni and the like, is plated. The conductive film 82 is, for example, of 10 μm thick. The machining apparatus has, as shown in FIG. 27A, a nut member 85, a feed screw 83 which is able to be fed at a predetermined pitch, and a cutter 84. The cylindrical member 80 is firm mounted on a end portion of the feed screw 83, then the cutter 84 is applied to the outer surface of the cylindrical member 80. Then the cylindrical member 80 is fed with the feed screw 83. Thus, a spiral groove 86, for example, of 0.3 μm depth, is formed on the outer surface of the cylindrical member 80. As a result, a spiral electrode pattern of the conductive film 82 are formed on the outer surface.

By use of the above method, the spiral electrode patterns on the rotors, as shown in FIG. 5B, FIG. 6B and the like, can be easily formed. Two sets of the spiral electrode patterns as shown in FIG. 9B or FIG. 12B can be formed by controlling rotating direction during machining. Even if the electrodes having other patterns in addition to the spiral patterns, for example, as shown in FIG. 4B, can be also formed by combination of rotation control and feed control.

Figure 28:
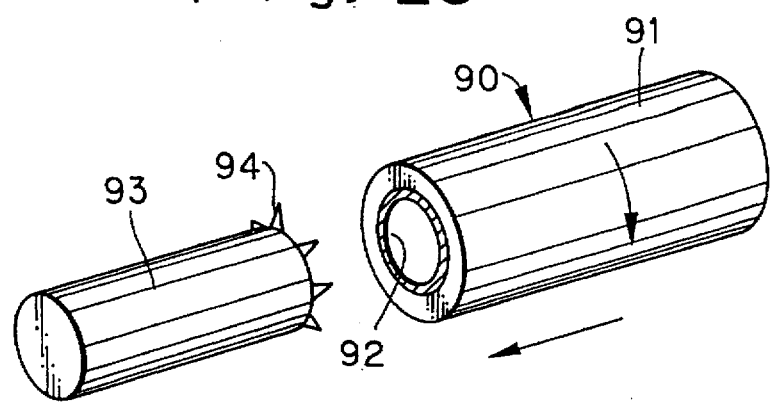
FIG. 28 shows a method for forming electrode patterns on the inner surface of the cylinder.

FIG. 28 shows a method for forming spiral electrode patterns in an inner surface of a cylindrical member 90. The cylindrical member 90 is formed of an injection molded plastic body 91 on whose inner surface a conductive film 92 is plated. A cutting tool 93 having eight cutters 94 on the edge is prepared. Then the cylindrical member 90 is fed by the same method as shown in FIG. 27A such as the cutting tool 93 is injected into the cylindrical member 90. Thus the conductive film 92 is cut by eight cutters 94 to be formed as spiral patterns. By this method, the spiral transmitting electrodes 13 of the cylindrical stator 61 shown in FIG. 19C, can be formed. For the halfway cylindrical stator, for example shown in FIG. 4A, the spiral transmitting electrodes 13 can be also formed in a similar way.

In the above embodiments, the inner axles are cylindrical members each having a cylindrical cavity. However, other cylindrical members which have no cavity can be used as an inner axle. As the outer collar members, not only rolled thin plates, but also other various materials including cylindrical and rectangular blocks in which cylindrical cavities are formed can be used. Alternatively, as the outer collar members, optional materials having cylindrical or incomplete cylindrical inner surfaces being able to be opposed to the inner member can be used.

What is claimed is:

1. A capacitance-type measuring device for measuring relative position between first and second elements which are arranged to be relatively movable with a predetermined gap, comprising: an array of transmitting electrodes disposed on said first element, alternating signals having different phases from each other being supplied to each transmitting electrode; a receiving electrode disposed on said first element such as to be isolated from said array of transmitting electrodes; and a coupling electrode disposed on said second element to be capacitively coupled to plural electrodes in said array of transmitting electrodes and said receiving electrode, said receiving electrode being adapted to output an electric signal corresponding to a relative position between said first and second elements, the electric signal being supplied to a measuring circuit, wherein one of said first and second elements is an inner member having a cylindrical outer surface, the other is an outer member having an incomplete cylindrical inner surface which is opposed to said outer surface with a predetermined gap, said first and second elements being held to be relatively movable in either axial direction or angular direction, and said array of transmitting electrodes and said receiving electrode are disposed on one of said outer surface of said inner member and said inner surface of said outer member, and said coupling electrode is disposed on the other.

2. The capacitance-type measuring device according to claim 1, wherein, said inner member is held to be relatively movable against said outer member in only angular direction, said array of transmitting electrodes is composed of a plurality of electrodes arranged on said inner surface of said outer member with a predetermined pitch in angular direction, each of which is a rectangular pattern longitudinal in axial direction, said receiving electrode is disposed near to said array of transmitting electrodes in axial direction on the inner surface of said outer member with a rectangular pattern longitudinal in angular direction, and said coupling electrode is disposed on said outer surface of said inner member with a rectangular pattern, a length in axial direction of the rectangular pattern covering said array of transmitting electrodes and said receiving electrode, and a width in angular direction of the rectangular pattern covering plural electrodes in said array of transmitting electrodes.

3. A capacitance-type measuring device for measuring relative position between first and second elements which are arranged to be relatively movable with a predetermined gap, comprising: an array of transmitting electrodes disposed on said first element, alternating signals having different phases from each other being supplied to each transmitting electrode; a receiving electrode disposed on said first element such as to be isolated from said array of transmitting electrodes; and a coupling electrode disposed on said second element to be capacitively coupled to plural electrodes in said array of transmitting electrodes and said receiving electrode, said receiving electrode being adapted to output an electric signal corresponding to a relative position between said first and second elements, the electric signal being supplied to a measuring circuit, wherein one of said first and second elements is an inner member having a cylindrical outer surface, the other is an outer member having a cylindrical inner surface which is opposed to said outer surface with a predetermined gap, said first and second elements being held to be relatively movable in either axial direction or angular direction, said array of transmitting electrodes and said receiving electrode are disposed on one of said outer surface of said inner member and said inner surface of said outer member, and said coupling electrode is disposed on the other, and both of said array of transmitting electrodes and said coupling electrode have spiral patterns with the same lead angle.

4. The capacitance-type displacement measuring device according to claim 3, wherein said outer member has an incomplete cylindrical inner surface.

5. The capacitance-type displacement measuring device according to claim 3, wherein said inner member is held to be movable against said outer member in only angular direction, said array of transmitting electrodes is composed of a plurality of electrodes disposed in parallel each other on said inner surface of said outer member with spiral patterns, said receiving electrode is disposed near to said array of transmitting electrodes in axial direction on the inner surface of said outer member with a rectangular pattern longitudinal in angular direction, and said coupling electrode is composed of a receiving portion disposed on said outer surface of said inner member with a spiral pattern with the same lead angle as the array of transmitting electrodes to be capacitively coupled to said array of transmitting electrodes and a transmitting portion disposed on said outer surface of said inner member to be capacitively coupled to said receiving electrode.

6. The capacitance-type measuring device according to claim 5, wherein said transmitting potion of said coupling electrode is disposed with a rectangular pattern longitudinal in angular direction and opposed to said receiving electrode, and electrically connected to said receiving portion.

7. The capacitance-type measuring device according to claim 5, wherein said coupling electrode is formed of a spiral pattern opposed to both of said array of transmitting electrodes and said receiving electrode.

8. The capacitance-type displacement measuring device according to claim 3, wherein said array of transmitting electrodes is composed of a plurality of electrodes disposed in parallel each other on said inner surface of said outer member with spiral patterns, said receiving electrode is disposed near to said array of transmitting electrodes in angular direction on the inner surface of said outer member with a rectangular pattern longitudinal in axial direction, and said coupling electrode is composed of a receiving portion disposed on said outer surface of said inner member with a spiral pattern with the same lead angle as the array of transmitting electrodes to be capacitively coupled to said array of transmitting electrodes and a transmitting portion disposed on said outer surface of said inner member to be capacitively coupled to said receiving electrode.

9. The capacitance-type measuring device according to claim 3, further comprising another array of transmitting electrodes disposed near to said array of transmitting electrodes in axial direction on said inner surface of said outer member, two sets of the array of transmitting electrodes having reverse patterns each other, and another coupling electrode disposed near to said coupling electrode in axial direction on said outer surface of said inner member, two sets of the coupling electrodes having reverse patterns each other and being opposed to said two sets of the array of transmitting electrodes respectively.

10. The capacitance-type measuring device according to claim 3, wherein said array of transmitting electrodes consists of N electrodes arranged around said inner surface of said outer member, where N is an integer greater than 2, N different alternating signals being applied to each of N electrodes, said N different alternating signals having phase shifted with respect to each other by 360/N degrees.

11. The capacitance-type measuring device according to claim 3, wherein said coupling electrode is divided into a plurality of electrodes uniformly spaced with a pitch obtained by dividing the transmitting wavelength pitch by an integer greater than 2.

* * * * *

UNITED STATES PATENT AND TRADEMARK OFFICE
CERTIFICATE OF CORRECTION

PATENT NO. : 5,691,646
DATED : November 25, 1997
INVENTOR(S) : Kouji SASAKI

It is certified that error appears in the above-indentified patent and that said Letters Patent is hereby corrected as shown below:

On the title page, in item [73], change "Mitutoya" to --Mitutoyo--.

Signed and Sealed this

Seventeenth Day of February, 1998

Attest:

BRUCE LEHMAN

Attesting Officer    Commissioner of Patents and Trademarks